US011900651B2

(12) United States Patent
Yoneyama

(10) Patent No.: US 11,900,651 B2
(45) Date of Patent: Feb. 13, 2024

(54) IMAGING DEVICE AND TRACKING METHOD

(71) Applicant: Olympus Corporation, Hachioji (JP)

(72) Inventor: Hisashi Yoneyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 610 days.

(21) Appl. No.: 17/094,449

(22) Filed: Nov. 10, 2020

(65) Prior Publication Data
US 2021/0303846 A1   Sep. 30, 2021

(30) Foreign Application Priority Data

Mar. 24, 2020   (JP) .................... 2020-052630

(51) Int. Cl.
| | |
|---|---|
| *G06V 10/62* | (2022.01) |
| *G06T 7/246* | (2017.01) |
| *G06T 7/70* | (2017.01) |
| *G06N 3/063* | (2023.01) |
| *G06N 3/08* | (2023.01) |
| *H04N 5/30* | (2006.01) |
| *G06V 20/00* | (2022.01) |
| *H04N 23/56* | (2023.01) |
| *G06V 10/82* | (2022.01) |

(52) U.S. Cl.
CPC ............ *G06V 10/62* (2022.01); *G06N 3/063* (2013.01); *G06N 3/08* (2013.01); *G06T 7/248* (2017.01); *G06T 7/70* (2017.01); *G06V 10/82* (2022.01); *G06V 20/00* (2022.01); *H04N 5/30* (2013.01); *H04N 23/56* (2023.01); *G06T 2207/20084* (2013.01)

(58) Field of Classification Search
CPC ........ G06V 10/62; G06V 10/82; G06V 20/00; G06N 3/063; G06N 3/08; G06N 3/045; G06T 7/248; G06T 7/70; G06T 2207/20084; H04N 5/30; H04N 23/56
See application file for complete search history.

(56) References Cited

U.S. PATENT DOCUMENTS

| | | | |
|---|---|---|---|
| 9,514,389 B1 | 12/2016 | Erhan et al. | |
| 11,232,294 B1* | 1/2022 | Banerjee | ................... G06T 7/73 |
| 2018/0189581 A1* | 7/2018 | Turcot | ................. G06V 20/597 |
| 2019/0130594 A1* | 5/2019 | Seyfi | ..................... G06V 10/764 |
| 2019/0156491 A1* | 5/2019 | Akiyama | ............... G06V 20/53 |
| 2020/0334837 A1* | 10/2020 | Feigl | ......... G06T 7/248 |
| 2022/0327818 A1* | 10/2022 | Sato | ......... G08G 1/16 |

FOREIGN PATENT DOCUMENTS

JP            09-049869 A      2/1997

* cited by examiner

*Primary Examiner* — John B Strege
(74) *Attorney, Agent, or Firm* — John C. Pokotylo; Pokotylo Patent Services

(57) ABSTRACT

An imaging device, comprising an image sensor that exposes a subject image and repeatedly outputs image signals resulting from having subjected this subject image to photoelectric conversion at a fixed period, a subject detection circuit in which the image signals are input to a neural network circuit that has learned operation parameters for detecting a specified subject by deep learning, and that detects the specified subject, and a subject association determination circuit for forming associations based on a positional relationship between a subject (whole subject) that has been detected by the subject detection circuit, and parts of the subject, wherein the specified subject is a subject (whole subject) and parts that have been subjected to subject association.

20 Claims, 18 Drawing Sheets

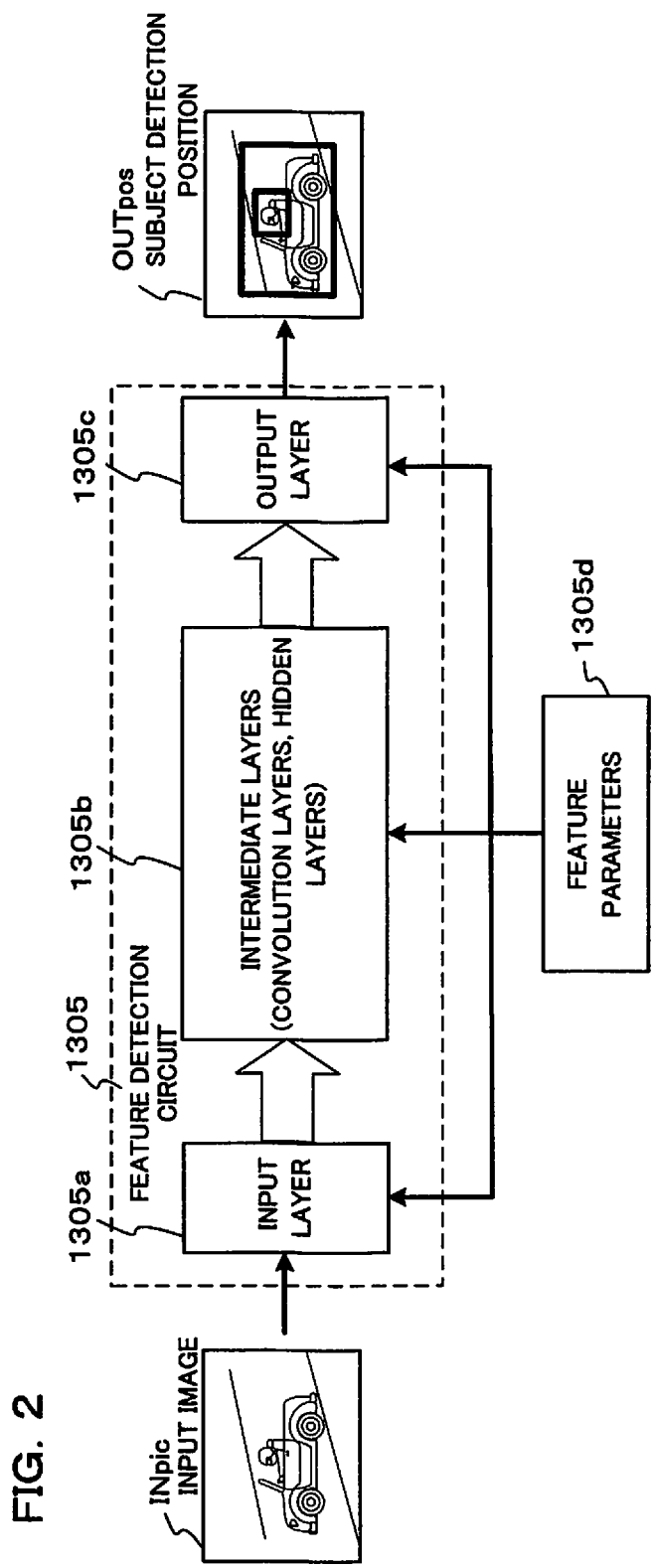

IMAGING DEVICE AND TRACKING METHOD

CROSS-REFERENCE TO RELATED APPLICATIONS

Benefit is claimed, under 35 U.S.C. § 119, to the filing date of prior Japanese Patent Application No. 2020-052630 filed on Mar. 24, 2020. This application is expressly incorporated herein by reference. The scope of the present invention is not limited to any requirements of the specific embodiments described in the application.

BACKGROUND OF THE INVENTION

1. Field of the Invention

The present invention relates to an imaging device and a tracking method that can detect a region, within a subject image, in which a specified target object exists, and track this target object.

2. Description of the Related Art

A tracking device, that periodically detects a specified subject, for taken images, using a neural network circuit and tracks the specified subject that has been detected, is proposed in Japanese patent laid-open No. Hei. 9-49869 (hereafter referred to as patent publication 1). A neural network circuit is a circuit that is made up of an input layer, intermediate layers, and an output layer, to which patterns that have been previously learned (inference models) are input as parameters of the neural network, and detects a specified subject from images. Images that are input to the neural network have had subjects that are not required removed in advance, and are further subjected to reduction processing at a fixed rate.

A target detection device that has subject detection means that uses a neural network, and detects position (region) where there is a specified subject, and detects existence probability (reliability) of that region from images that have been input, is proposed in U.S. Pat. No. 9,514,389 (hereafter referred to as patent publication 2).

SUMMARY OF THE INVENTION

An imaging device of a first aspect of the present invention comprises: an image sensor that exposes a subject image and repeatedly outputs image signals resulting from having subjected this subject image to photoelectric conversion at a fixed period, a subject detection circuit in which the image signals are input to a neural network circuit that has learned operation parameters for detecting a specified subject by deep learning, and that detects the specified subject, and a subject association determination circuit for forming associations based on a positional relationship between a subject (whole subject) that has been detected by the subject detection circuit, and parts of the subject, wherein, the specified subject is a subject (whole subject) and its parts that have been subjected to subject association.

An imaging device of a second aspect of the present invention comprises an image sensor that exposes a subject image and repeatedly outputs image signals resulting from having subjected this subject image to photoelectric conversion at a fixed period, a subject detection circuit in which the image signals are input to a neural network circuit that has learned operation parameters for detecting a specified subject by deep learning, and that detects the specified subject, and a subject detection and interpolation circuit that interpolates tracking position, based on feature amounts of the subject, for images that are acquired from the image signals, with position of the specified subject that has been detected by the subject detection circuit made a reference.

A tracking method of a third aspect of the present invention comprises exposing a subject image and repeatedly outputting image signals resulting from having subjected this subject image to photoelectric conversion at a fixed period, detecting the specified subject using a neural network circuit that has learned operation parameters for detecting the subject, from the image signals, and forming associations based on a positional relationship between body portions and part portions, in the specified subject that has been detected, wherein the specified subject is a subject (whole subject) and parts that have been subjected to subject association.

A tracking method of a fourth aspect of the present invention comprises exposing a subject image and repeatedly outputting image signals resulting from having subjected this subject image to photoelectric conversion at a fixed period, inputting the image signals to a neural network circuit that has learned operation parameters for detecting the specified subject, and detecting the specified subject, and interpolating tracking position, based on feature amounts of the subject, for images that are acquired from the image signals, with position of the specified subject that has been detected made a reference.

A non-transitory computer-readable medium of a fifth aspect of the present invention, storing a computer program for implementing a tracking method, the tracking method comprising exposing a subject image and repeatedly outputting image signals that have been subjected to photoelectric conversion at a fixed period, and detecting the specified subject using a neural network circuit that has learned operation parameters for detecting the subject, from the image signals and forming associations based on a positional relationship between body portions and part portions, in the specified subject that has been detected, wherein the specified subject is a subject (whole) and parts that have been subjected to subject association.

A non-transitory computer-readable medium of a fifth aspect of the present invention, storing a computer program for implementing a tracking method, the tracking method comprising exposing a subject image and repeatedly outputting image signals that have been subjected to photoelectric conversion at a fixed period, detecting the specified subject using a neural network circuit that has learned operation parameters for detecting the subject, from the image signals, and interpolating tracking position, based on feature amounts of the subject, for images that are acquired from the image signals, with position of the specified subject that has been detected made a reference.

BRIEF DESCRIPTION OF THE DRAWINGS

FIG. 2 is a block diagram showing details of a feature detection circuit of the camera relating to the first embodiment of the present invention.

DETAILED DESCRIPTION OF THE PREFERRED EMBODIMENTS

Figure 1A:
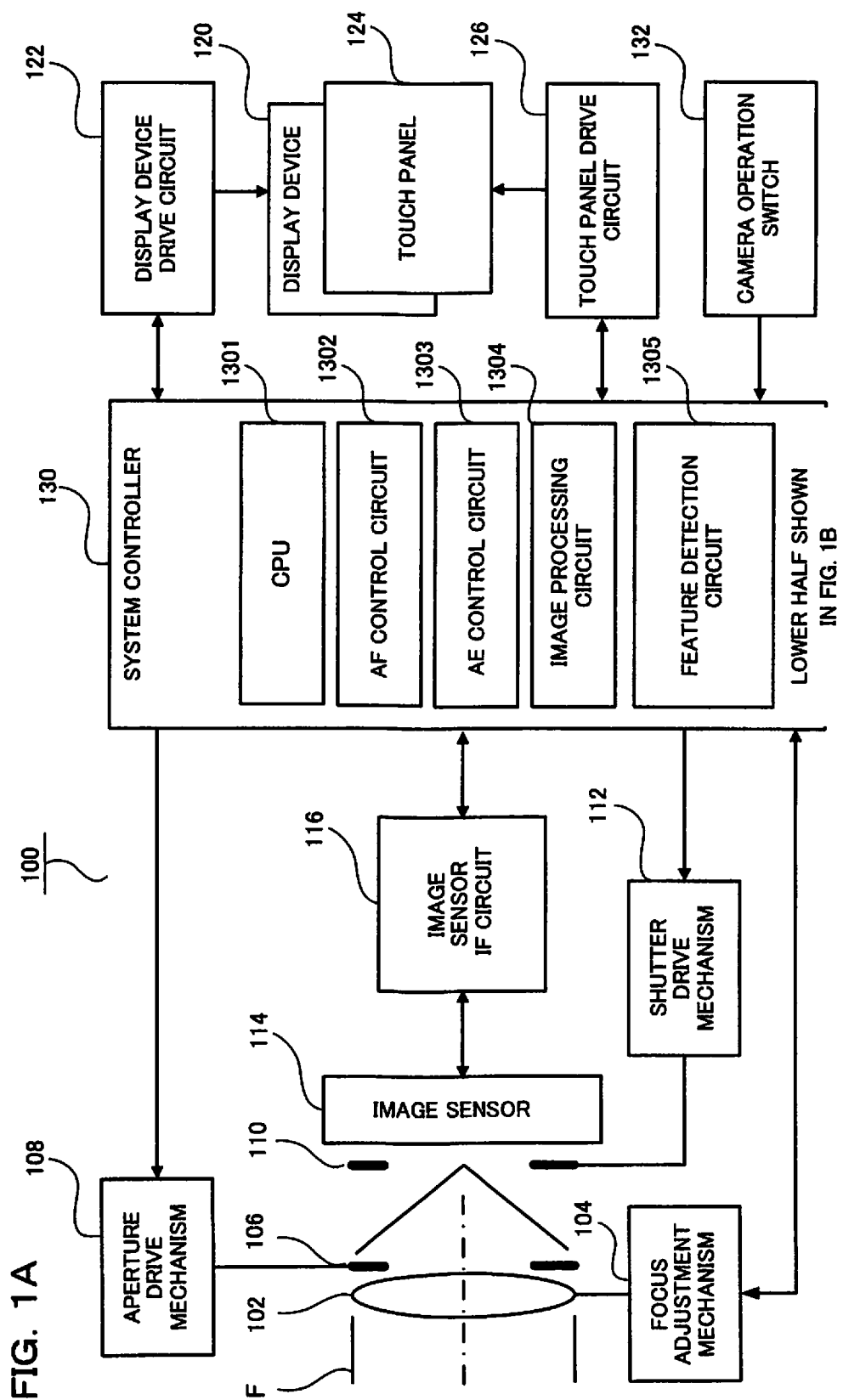
FIG. 1A and FIG. 1B are block diagrams mainly showing the electrical structure of a digital camera (hereafter abbreviated to camera) of a first embodiment of the present invention.

One embodiment of the present invention will be described in the following. Various techniques for tracking a specified subject have previously been proposed. There are two elements that have a significant effect tracking performance, namely (1) computational processing speed for detecting a target subject, and (2) likelihood of detecting a target subject from images.

In the case where a target subject is detected from within taken images, and this target subject is tracked, it is necessary to speed up processing speed for detection of the subject. With a method in which target subject is detected using a neural network (particularly deep learning having many computational layers), computational scale becomes large. As a result, it is not easy to make detection of a target subject high-speed. Specifically, when tracking a target subject that is moving at high speed from within taken images, there may be cases where tracking fails due to delayed detection time until the target subject is detected, and there may be cases where achieving focus on a tracking subject in real time becomes difficult. Accordingly, while techniques for detecting the subject using a neural network have high performance with respect to subject detection, processing speed is delayed due to the computational scale becoming large, and delay arises in detection time.

Also, in focusing on a target subject with high precision it is necessary to focus on parts (portions) of the target subject. For example, in a case where a target subject is a formula car (a racing car, open-wheel car), it is necessary to focus not only on the vehicle body, but on the driver's helmet or a front bumper etc. (parts), and to focus on the parts that have been detected. Since parts that can be detected change in accordance with conditions of the subject and shooting environment, to maintain a focused state on a target subject it is necessary for body and parts of the same subject to always be associated. On the other hand, in a case of detecting a target subject using a neural network, since a body and a plurality of different parts are not respectively associated, it is not possible to determine that they are for the same subject. As a result of this, in a case where a body that has been detected, and part portions of that body, are made tracking targets, there may be cases where a subject comprising different parts to the parts of the target subject is erroneously set as a tracking target.

One embodiment of the present invention described in the following has been conceived in view of the above described situation, and provides an imaging device, and tracking method, that are capable of detecting and tracking parts constituting a target, even if a plurality of parts that include parts that are different to a target subject exist in a range of the target subject that will be tracked. There is also provided an imaging device and tracking method that can reliably track a target subject, even in a case where a neural network is used that requires processing time in order to perform subject detection.

An example where the imaging device of the present invention has been applied to a camera, as a preferred embodiment of the present invention, will be described in the following. This camera has an imaging section, with a subject image being converted to image data by this imaging section, and the subject image being subjected to live view display on a display section arranged on the rear surface etc. of the camera body based on this converted image data. A photographer determines composition and photo opportunity by looking at the live view display. At the time of a release operation image data is stored in a storage medium. Image data that has been stored in the storage medium can be subjected to playback display on the display section if playback mode is selected.

An imaging section of the camera of the present invention exposes a subject image, and repeatedly outputs image signals that have been subjected to photoelectric conversion at a fixed period. This camera is also provided with a subject detection section that has a neural network circuit that has learned operation parameters for detecting a specified subject by deep learning (for example, feature detection circuit 1305), and this subject detection section detects a specified subject. This camera has a subject detection and interpolation section (for example, the interpolation and tracking circuit 1306) that interpolates tracking position for images that have been acquired from image signals, based on subject feature amounts, with position of the specified subjects that has been detected by the subject detection section made a reference. Since this camera can interpolate tracking position that has been detected by the tracking circuit etc. using subject position that has been detected using a neural network, it is possible to perform tracking at high speed and with high precision.

Also, the camera of a preferred embodiment of the present invention has a subject association determination section (for example, the detection result association processing section 1305B) that performs association based on a positional relationship between a subject (whole) and parts, in a case where the subject detection section has detected position of a subject (whole) and parts. Since positional relationships between a subject (whole) and parts are associated, it is possible to detect and track parts that constitute a target, even if a plurality of parts that include parts that are different from a target subject exist in a range of the target subject to be tracked.

Figure 1B:
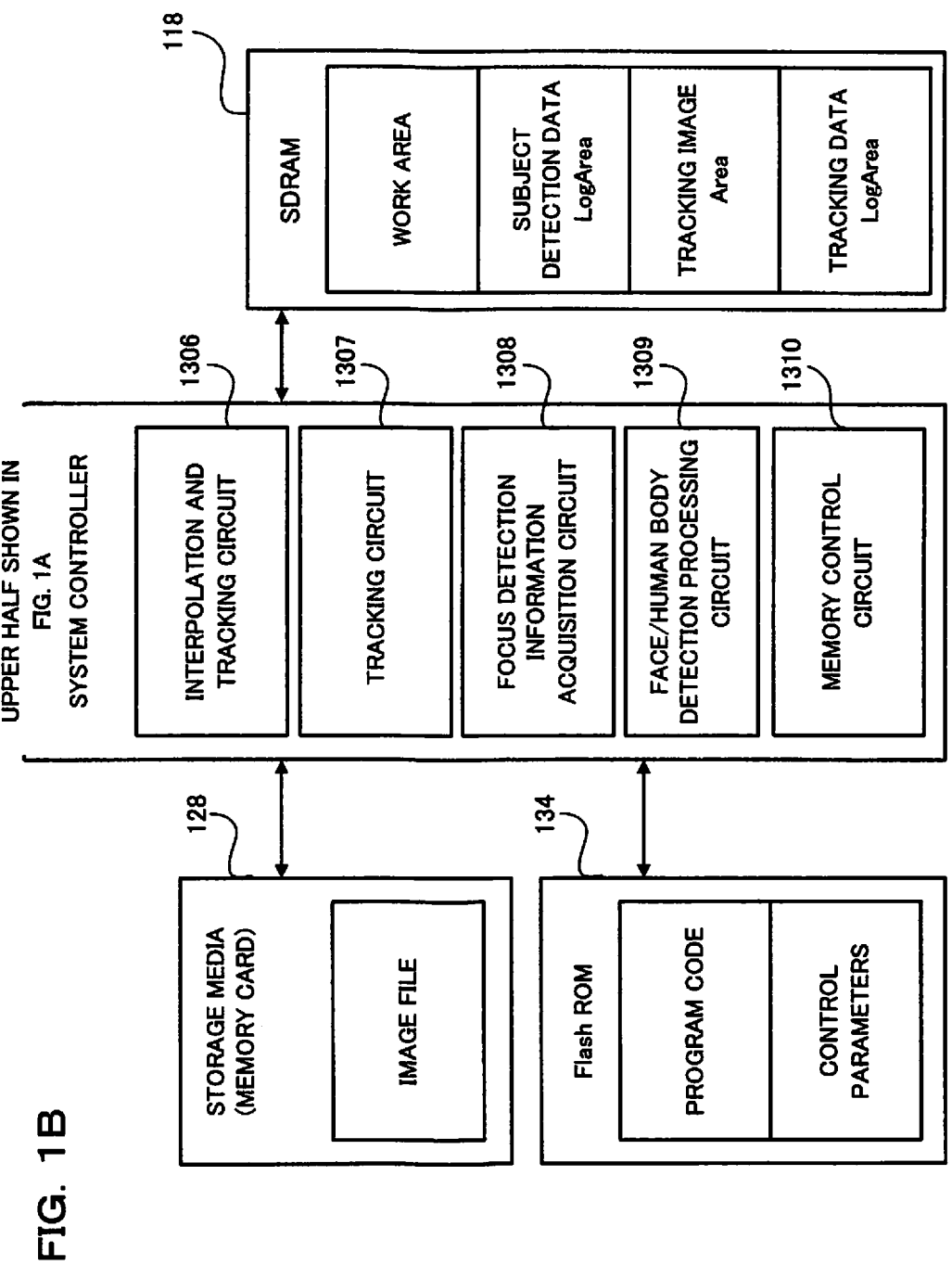

FIG. 1A and FIG. 1B are block diagrams mainly showing the electrical structure of a camera of a first embodiment.

A photographing lens 102 is an optical system for forming an image of a subject F in the vicinity of an image sensor 114, and includes a focus lens etc. A focus adjustment mechanism 104 has an actuator (for example, a motor) for moving the focus lens in an optical axis direction, and a drive circuit for the actuator, etc. Focused state of a subject image on the image sensor 114 is changed by moving the focus lens in an optical axis direction. The focus adjustment mechanism 104 performs autofocus control based on control signals from an AF control circuit 1302 within a system controller 130.

An aperture 106 is arranged within an optical path of subject light that has passed through the photographing lens 102. The aperture 106 has aperture blades, and opening diameter is changed using the aperture blades under the control of an aperture drive mechanism 108, to adjust subject light amount that reaches the image sensor 114. The aperture drive mechanism 108 has an actuator for driving the aperture blades so as to change the opening diameter, and a drive circuit for the actuator etc. The aperture drive mechanism 108 performs drive control of the aperture blades based on control signals from an AE control circuit 1303 within the system controller 130.

A mechanical shutter 110 is arranged within an optical path of subject light that has passed through the photographing lens 102. The mechanical shutter 110 performs opening and closing operations using a shutter drive mechanism 112, and controls a time for which subject light is incident on the image sensor 114. The shutter drive mechanism 112 comprises a shutter curtain, an actuator for shutter curtain drive, and a drive circuit for the actuator. The shutter drive mechanism 112 performs drive control of the shutter curtain based on control signals from the AE control circuit 1303 within the system controller 130.

The image sensor 114 is an image sensor such as a CCD image sensor or a CMOS image sensor, and subjects a subject image that has been formed by the photographing lens 102 to photoelectric conversion and outputs image signals to an image sensor IF (interface) circuit 116. The image sensor IF circuit 116 performs control of exposure time for each pixel of the image sensor and read out of pixel signals from each pixel, performs A/D conversion of the pixel signals, and outputs image data to the system controller. It should be noted that if the system controller 130 has an A/D converter, the image sensor IF circuit 116 may output an image signal to the system controller 130, and the system controller 130 may perform A/D conversion. The image sensor 114 functions as an image sensor (imaging section) that exposes a subject image and repeatedly outputs image signals resulting from having subjected this subject image to photoelectric conversion at a fixed period. It should be noted that in this specification, image data that has been read out from the image sensor 114 and subjected to A/D conversion is sometimes referred to as "image data that has been acquired from the image sensor 114".

The system controller 130 is a processor having a CPU (Central Processing Unit) 1301 and various circuits. As the various circuits, the system controller 130 has the AF control circuit 1302, AE control circuit 1303, image processing circuit 1304, feature detection circuit 1305, interpolation and tracking circuit 1306, tracking circuit 1307, focus detection information acquisition circuit 1308, face/human body detection processing circuit 1309, and memory control circuit 1310. These circuits may be hardware circuits, and some or all of the functions of these circuits may be realized using programs.

The CPU 1301 performs overall control of the camera 100 based on program code that has been stored in flash ROM 134. It should be noted that there may be one or a plurality of processors constituting the previously described system controller 130. Also, in a case where a plurality of processors are provided, a plurality of CPUs 130 may be provided, and in this case overall control of the camera 100 is performed by the plurality of CPUs operating together.

The AF control circuit 1302 performs AF control based on image data from the image sensor 114, so as to move the focus lens of the photographing lens 102 to an in-focus position, by means of the focus adjustment mechanism 104. As a focus detection method, there is, for example, a contrast method where control is performed so that a contrast value (in-focus evaluation value) of image data becomes a peak. There is also a phase difference method where phase difference pixels are arranged on the image sensor 114, a defocus amount of the focus lens is calculated based on pixel data from these phase difference pixels, and the focus lens is driven based on this defocus amount.

The AE control circuit 1303 is input with image data from the image sensor IF circuit 116, and calculates subject brightness value. The AE control circuit 1303 also determines aperture value (Av), shutter speed value (Tv), and ISO sensitivity value (Sv) for exposure control based on shooting mode and setting values for exposure control that have been set using a touch panel 124 or a camera operation switch 132, and a subject brightness value that has been calculated, and outputs these exposure control values that have been determined to the aperture drive mechanism 108, shutter drive mechanism 112, and image sensor IF circuit 116.

The image processing circuit 1304 applies various image processing such as exposure correction and noise processing, WB (White Balance) gain correction, edge enhancement, false color correction etc. to image data that has been output from the image sensor IF circuit 116 or image data that has been temporarily stored in SDRAM 118. The image processing circuit 1304 also performs processing (development processing) to convert image data that has been subjected to the above described image processing to a stored data format.

The feature detection circuit 1305 Is input with image data that has been output from the image sensor IF circuit 116, and detects an image region in which there is a specified subject that has been set in advance. The feature detection circuit 1305 has a multilayer neural network (inference engine), and the region in which there is the specified subject is detected using this neural network. Detailed structure of this feature detection circuit 1305 will be described later using FIG. 2.

Figure 4A:
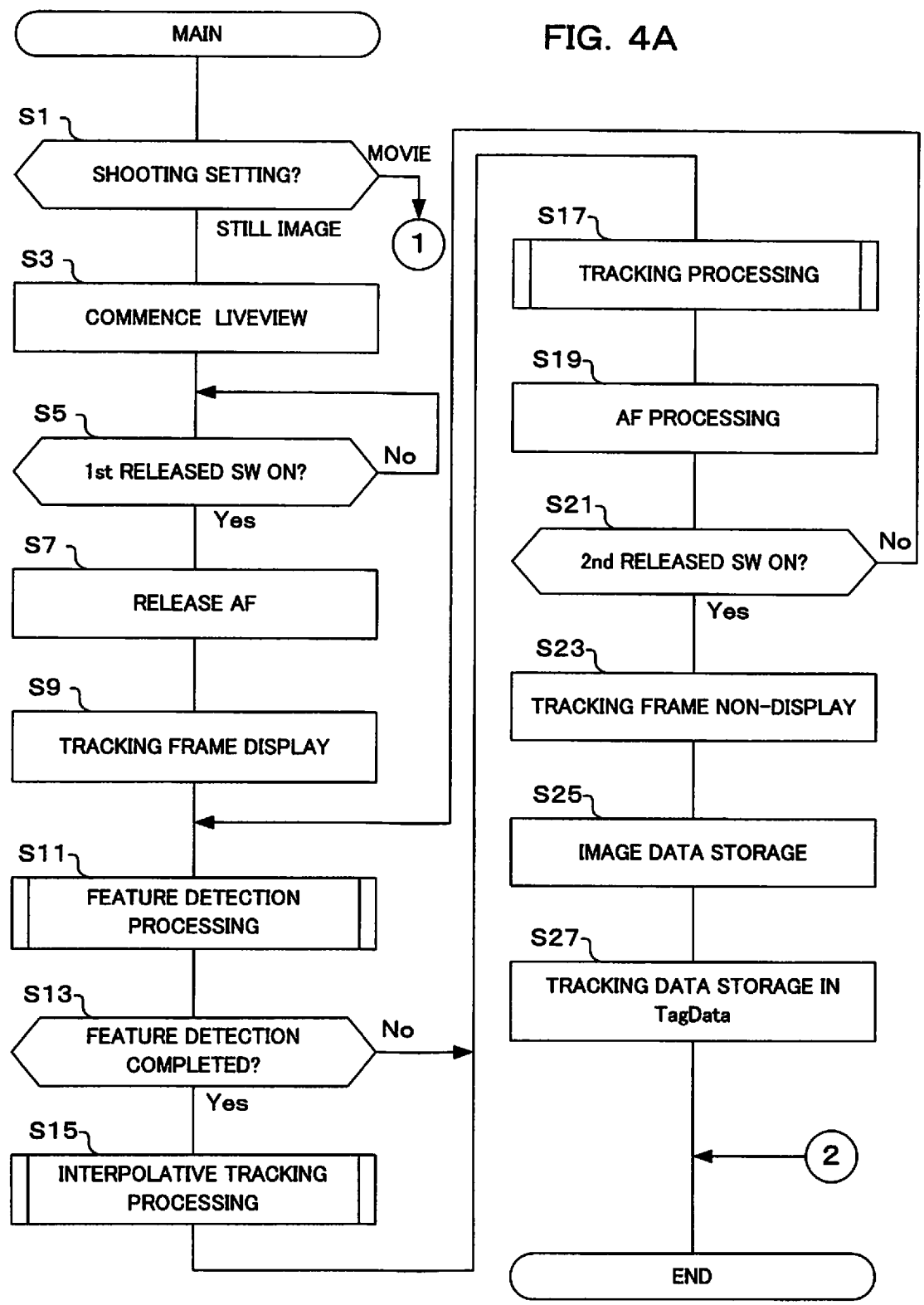
FIG. 4A and FIG. 4B are flowcharts showing operation of a shooting sequence, in the camera of the first embodiment of the present invention.
Figure 4B:
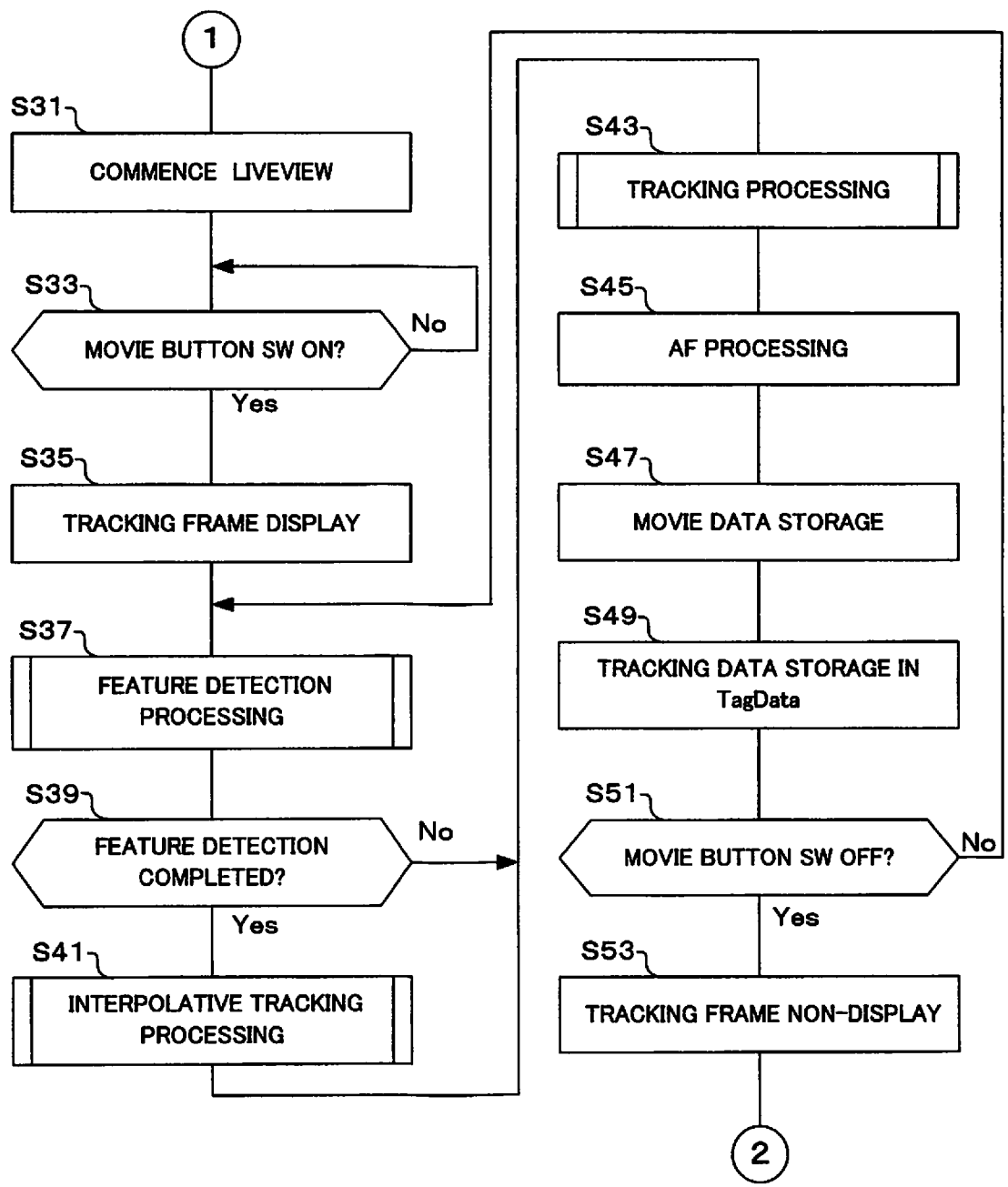

The feature detection circuit 1305 functions as a subject detection circuit (subject detection section) that has image signals input to a neural network circuit that has learned operation parameters for detecting a specified subject, by means of deep learning and detects the specified subject (refer, for example, to S11 in FIG. 4A, and S37 in FIG. 4B). The feature detection circuit 1305 has a priority order setting circuit (priority order setting section) that sets a priority order for subjects that will be targets of interpolative tracking, for a plurality of subjects. As will be described later, the feature detection circuit 1305 can detect a plurality of portions simultaneously, from a single image. At the time of interpolative tracking, since there may also be cases where interpolative tracking processing of a plurality of portions is not possible at the same time, it is made possible to set a priority order. This setting may be performed automatically, and may be manual setting by the user. In a case where the whole of an organism and the eyes have been detected as subjects by the subject detection circuit (subject detection section) at the same time, the priority order setting circuit (priority order setting section) sets the whole of the organism, and the eyes, as subjects to be targets of interpolative tracking. In the case where the whole of a vehicle and the driver of a vehicle have been detected simultaneously as subjects by the subject detection circuit (subject detection section), the priority order setting circuit (priority order setting section) sets the vehicle or the driver as subjects to be targets of interpolative tracking (refer, for example, to FIG. 13 and FIG. 14).

The tracking circuit 1307 is input with image data that has been output from the image sensor IF circuit 116, searches for a target subject, and tracks position of the target subject for every frame image using pattern matching etc., for example. Specifically, the tracking circuit 1307 tracks position of a target subject within an image, even if the target subject is moving. Details of the tracking circuit 1307 will be described later using FIG. 3.

Figure 8:
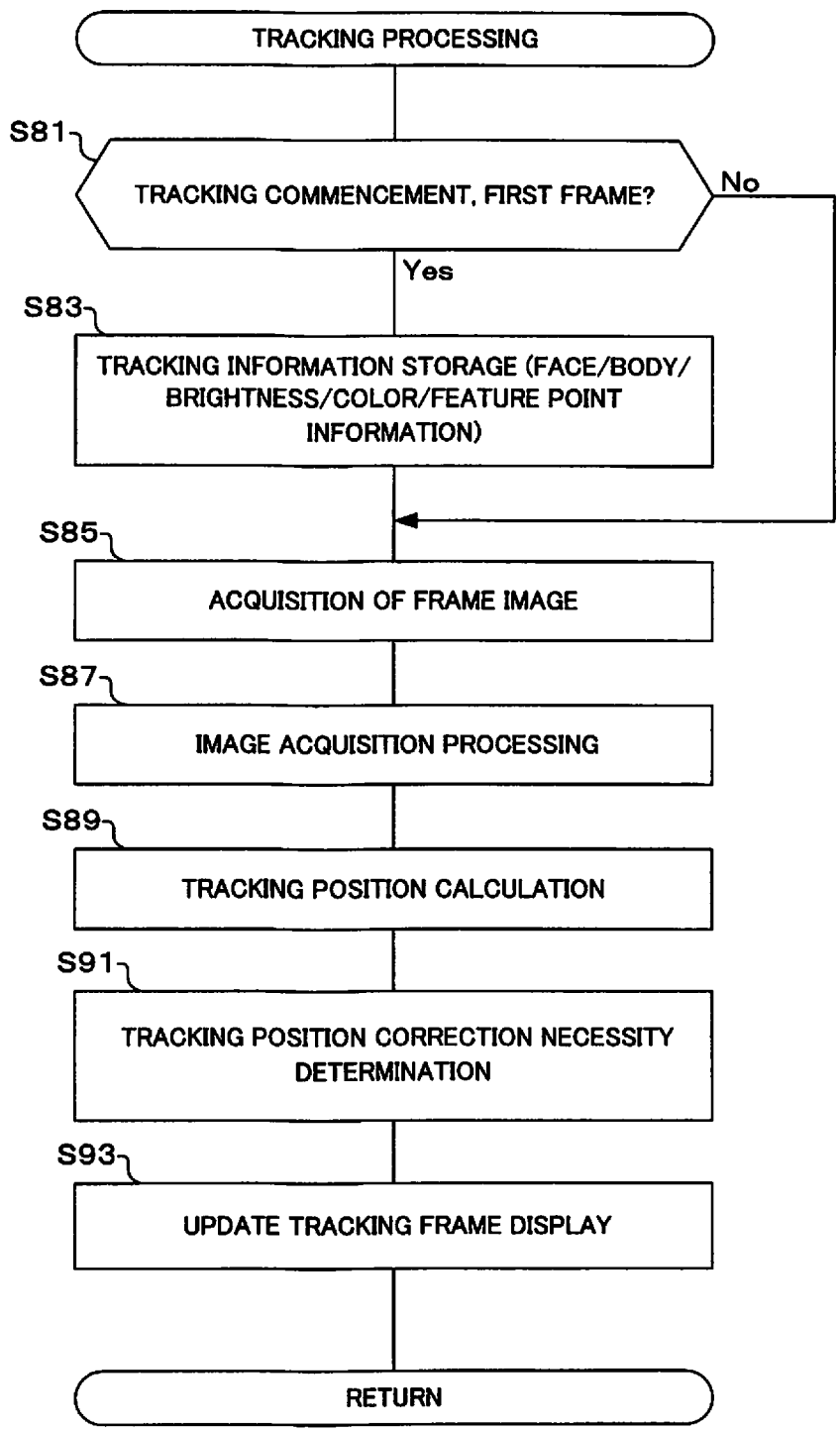
FIG. 8 is a flowchart showing operation of tracking processing, in the camera of the first embodiment of the present invention.

The tracking circuit 1307 functions as a subject tracking circuit (subject tracking section) that tracks a subject that has been designated in advance, in images that are acquired from image signals (refer, for example to S17 in FIG. 4A, S43 in FIG. 4B, and FIG. 8 etc.). The tracking circuit 1307 (particularly the tracking position correction suitability judging section 1307c) functions as a subject tracking position correction circuit (subject tracking position correction section) that corrects tracking position using results of having performed interpolative tracking on a subject with the subject detection and interpolation circuit (subject detection and interpolation section) (refer to S91 in FIG. 8, for example). The subject tracking position correction circuit (subject tracking position correction section) determines whether or not correction of tracking position is necessary based on tracking results of the subject tracking circuit (subject tracking section) and interpolative tracking results of the subject detection and interpolation circuit (subject detection and interpolation section) (refer, for example, to S91 in FIG. 8). The subject tracking position correction circuit (subject tracking position correction section) determines whether or not correction of tracking position is necessary based on a difference between tracking position that has been detected by the subject tracking circuit (subject tracking section) and interpolative tracking position of the subject detection and interpolation circuit (subject detection and interpolation section) (refer, for example, to S91 in FIG. 8). The subject tracking position correction circuit (subject tracking position correction section) determines whether or not correction of tracking position is necessary based on subject detection results that have been detected by the subject detection circuit (subject detection section) from a current image, or subject detection results that have been detected from a previous image (refer, for example, to S91 in FIG. 8).

The interpolation and tracking circuit 1306 searches for position of a target subject that has been detected by the feature detection circuit 1305 within frame images. Since position of the target subject from the feature detection circuit 1305 is output in every specified frame (with the examples of FIG. 7 and FIG. 9, which will be described later, every 60 frames), the interpolation and tracking circuit 1306 corrects position of the target subject detected by the tracking circuit 1307 at intervals corresponding to a specified frame. Details of the interpolation and tracking circuit 1306 will be described later using FIG. 3. The interpolation and tracking circuit 1306 functions as a subject detection and interpolation circuit (subject detection and interpolation section) that interpolates tracking position based on feature amounts of a subject in images acquired from image signals, with position of a specified subject that has been detected by the subject detection section as a reference (refer, for example, to S15 in FIG. 4A and S41 in FIG. 4B).

Figure 6:
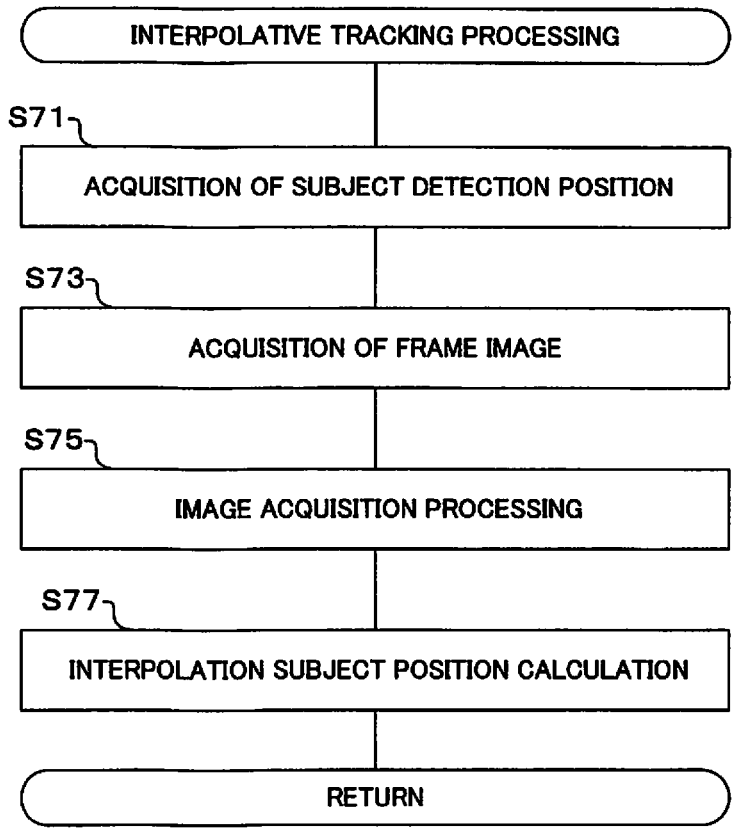
FIG. 6 is a flowchart showing operation of interpolation tracking processing, in the camera of the first embodiment of the present invention.
Figure 7:
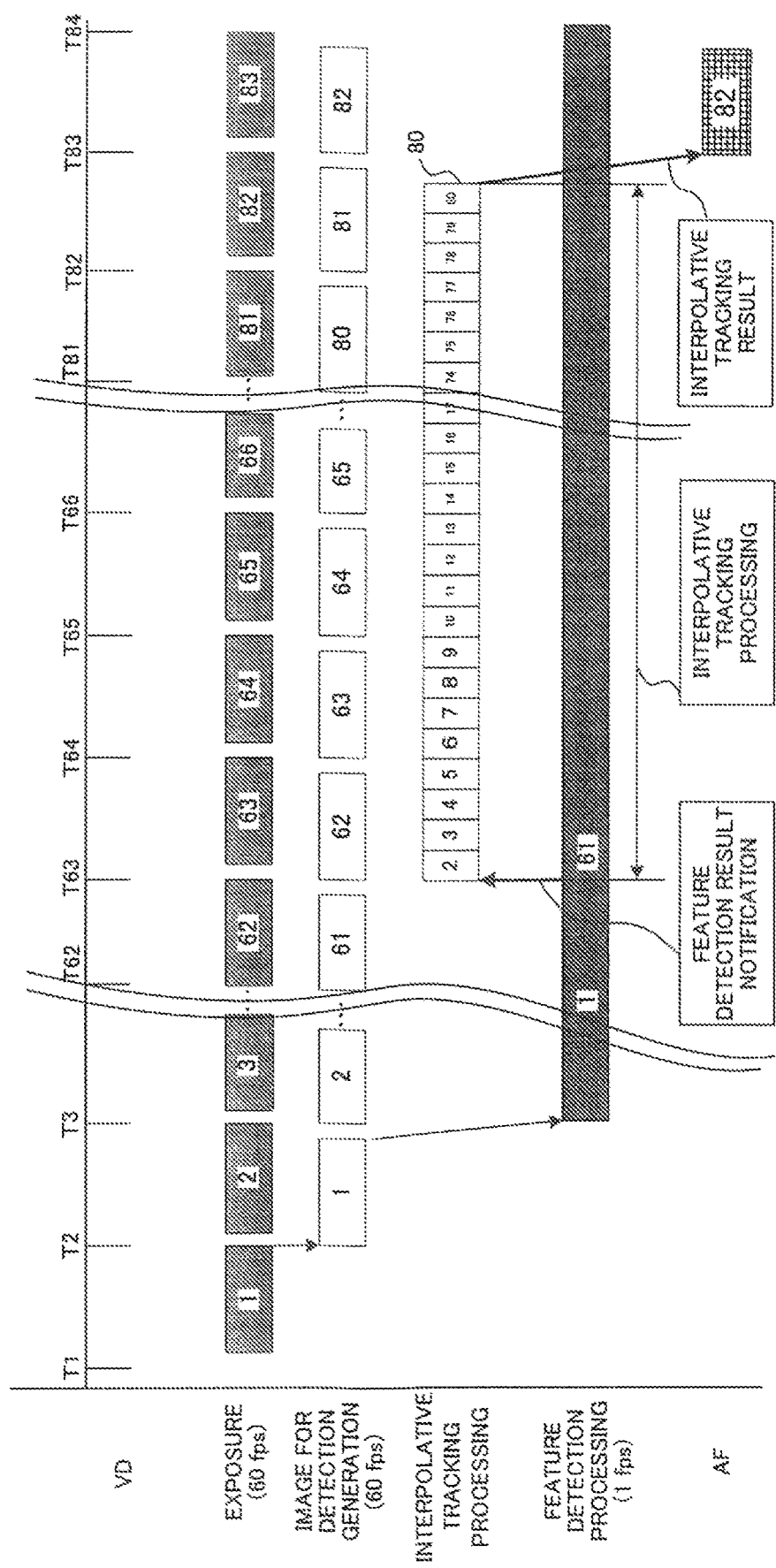
FIG. 7 is a timing chart showing operation of detecting a target subject, where auto focus (AF) is performed from input images, in the camera of the first embodiment of the present invention.
Figure 9:
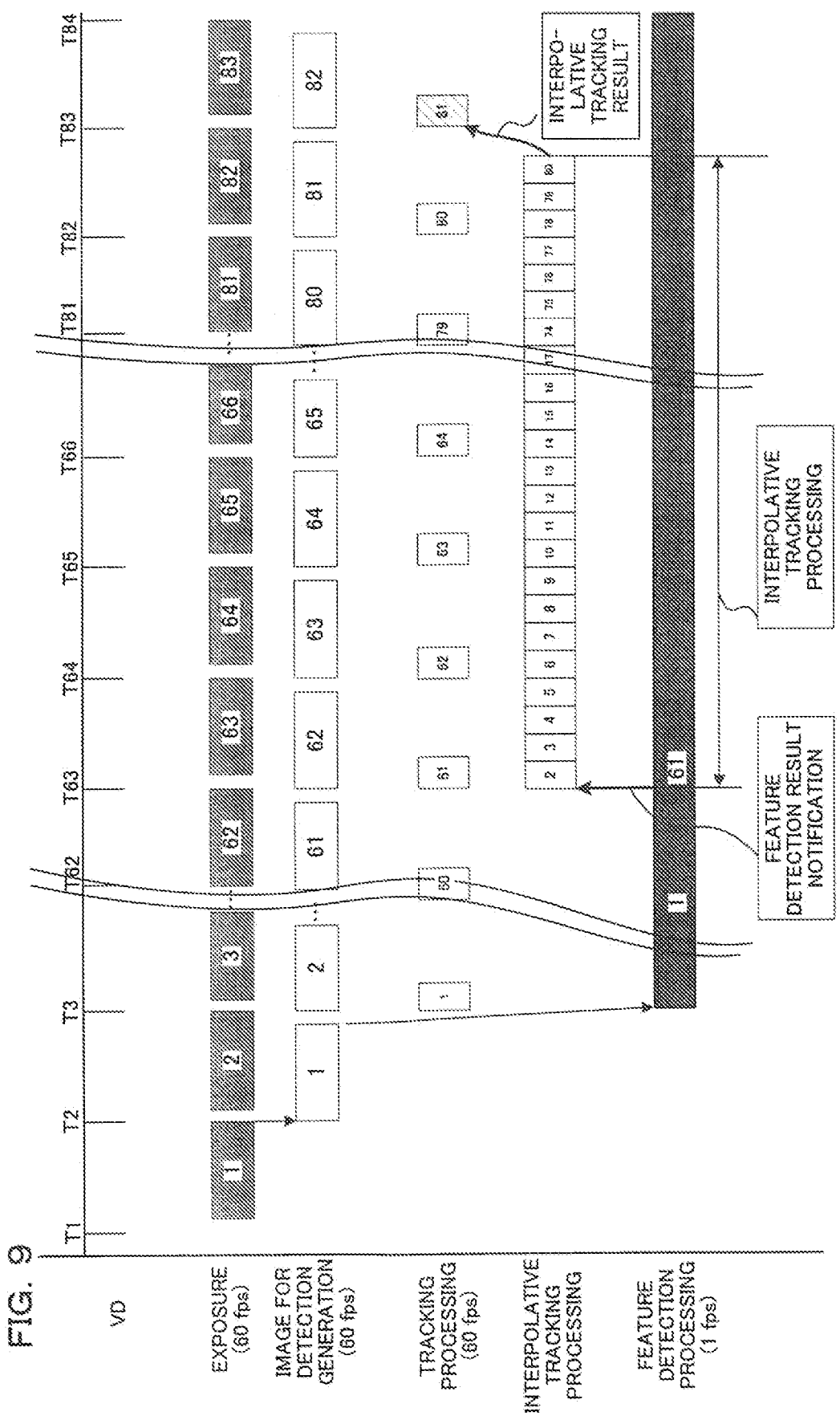
FIG. 9 is a timing chart showing operation of tracking a target subject from input images, in the camera of the first embodiment of the present invention.

The subject detection and interpolation circuit (subject detection and interpolation section) performs tracking interpolation of a subject by selecting at least one from among brightness information, color information, information on feature points, information on face detection, and information on body detection (refer, for example, to S15 in FIG. 4A, S41 of FIG. 4B, S77 in FIG. 6, and the interpolative tracking processing of FIG. 7 and FIG. 9). In a case where a plurality of subjects have been detected by the subject detection circuit (subject detection section), the subject detection and interpolation circuit (subject detection and interpolation section) performs interpolative tracking of the subject in accordance with a priority order that has been set in the priority order setting circuit (priority order setting section) (for example, S77 in FIG. 6).

The focus detection information acquisition circuit 1308, acquires subject distance information that has been detected by the AF control circuit 1302. In the event that the AF control circuit 1302 has performed focus adjustment of the focus lens using a contrast method, distance information of the subject is acquired based on position of the focus lens when in-focus. Also, in the event that the AF control circuit 1302 has performed focus adjustment of the focus lens using a phase difference method, distance information of the subject is acquired based on defocus amount of the focus lens. The focus detection information acquisition circuit 1308 functions as a subject distance detection circuit (subject distance detection section) that detects respective distances for positions of a subject (entire body) and parts that have been detected by the subject detection circuit (subject detection section). The face/human body detection processing circuit 1309 is input with image data, and detects position of portions where a human body is, and positions of faces etc. The memory control circuit 1310 performs control of reading and storage of data, to and from memory such as the storage medium 128, flash ROM 13 and SDRAM 118.

The storage medium 128 is an electrically rewritable non-volatile memory, and is a memory card that can be inserted into and taken out of the body of the camera 100. The storage medium 128 stores image files, and the image files can be read out. Specifically, image data that has been acquired by shooting is stored, and it is possible to playback taken images based on image file that have been read out.

The flash ROM 134 is an electrically rewritable nonvolatile memory, and stores program code and control parameters etc. As was described previously, program code is used at the time of control of the camera 100 by the CPU 1301.

Also, control parameters are electrical and mechanical parameters for the camera 100, and are used at the time of control of the camera 100.

The SDRAM 118 is electrically rewritable volatile memory, and temporarily stores large amounts of data on high-speed, and this data can be read out. The SDRAM 118 has a work area, a subject detection data Log Area, a tracking image Area, and a tracking data Log Area. The work area is a storage area that is temporarily used at the time of processing by the CPU 1301. The subject detection data Log Area is an area used when a subject has been detected, for storing the position of that subject. The tracking image Area is an area for temporarily storing images, for the purpose of performing pattern matching for tracking. The tracking data Log Area is an area for storing position of a tracking target.

A display device 120 is a display such as a rear surface panel for display, or a display panel for an electronic viewfinder that is viewed by means of an eyepiece. An LCD or organic EL monitor etc. is used as the display device 120. A display device drive circuit 122 is a drive circuit for the display device 120, and performs drive control of the display device 120 based on control signals from the system controller 130. The display device 120 functions as a display (display section) that displays images based on image signals. The display device 120 also functions as a display (display section) that displays symbols to depict a tracking frame at tracking positions that have been corrected by the subject tracking position correction section (refer, for example, to S93 in FIG. 8). The display (display section) determines and displays display positions for a tracking frame showing tracking positions, based on subject detection results that have been detected by the subject detection section from a current image, or subject detection results that have been detected from a previous image.

The touch panel 124 is arranged on the front of the display device 120, and detects that the user has touched a screen of the display device 120. A touch panel drive circuit 126 is a drive circuit for the touch panel 124, and outputs touch position etc. to the system controller 130 if the touch panel 124 has detected touch by the user.

A camera operation switch 132 is an input interface for user operating instructions, and is, for example, a power switch, operation dial, operation buttons, 1st release SW and 2nd release SW linked to a release button, etc. If the user presses the release button down halfway, the 1st release SW is turned on, and if the release button is pressed out fully the 2nd release SW is turned on. Also, a movie button SW is a switch that is turned on if a movie button is pressed.

Next, the feature detection circuit 1305 will be described using FIG. 2. As was described previously, the feature detection circuit 1305 has parameters (inference model) set in a neural network, detects a specified subject from within input images, and outputs position of that specified subject. The parameters of the neural network can be calculated by performing machine learning etc. using predetermined large-scale learning data (inputs and responses to those inputs). This machine learning is executed in advance, and parameters, which are learning results, are set in the feature detection circuit 1305.

The feature detection circuit 1305 is a neural network circuit comprising an input layer 1305*a*, intermediate layers 1305*b*, and an output layer 1305*c*, and feature parameters 1305*d* are set in each layer of the feature detection circuit 1305. The input layer 1305*a*, intermediate layers 1305*b*, and output layer 1305*c* are provided with a plurality of nodes that determine existence probability of feature parameters that are within respective images.

An input image INpic is input to the input layer 1305*a*, and for this input image INpic a state variable is output to the intermediate layers 1305*b* by means of nodes that determine whether or not there is a feature parameter. The intermediate layers 1305*b* are also referred to as convolution layers or hidden layers, and are made up of a plurality layers. Nodes are also provided in each layer, and a state variable is output to the next layer depending on a feature parameter. This processing is repeated for every layer, and a state variable is finally output to the output layer 1305*c*. The output layer 1305*c* combines a plurality of state variables that have been output from the intermediate layers 1305*b*, extracts a region in which a specified subject exists from within an image, and outputs the results of this extraction as a subject detection position OUTpos. In the case of feature detection of an image, various filtering processing is performed for an input image, and existence probability of a feature parameter for an image resulting from having been subjected to filtering processing is determined.

Next, details of the tracking circuit 1307 and the interpolation and tracking circuit 1306 will be described using FIG. 3. As was described previously, the tracking circuit 1307 performs tracking of a specified subject using a pattern matching method or the like, using image data that has been read out from the image sensor 114 in fixed frames. The interpolation and tracking circuit 1306 corrects position of the specified subject that has been detected by the tracking circuit 1307, as required, based on position of a specified subject detected at fixed frame intervals by the feature detection circuit 1305.

The tracking circuit 1307 comprises an image memory 1307*a*, a tracking position calculation section 1307*b*, and the tracking position correction suitability judging section 1307*c*. The image memory 1307*a* stores image data of each frame from the image sensor 114. Previous frame image data that has been stored in the image memory 1307*a* is read out by the tracking position calculation section 1307*b*.

The tracking position calculation section 1307*b* calculates correlation between a previous frame image that is stored in the image memory 1307*a* and the current frame image, and detects position of a specified subject, specifically, tracking position. The tracking position calculation section 1307*b* outputs the tracking position that has been calculated to the tracking position correction suitability judging section 1307*c*.

The tracking position correction suitability judging section 1307*c* compares tracking position that has been output by the tracking position calculation section 1307*b* and interpolated subject position that has been output by the interpolation and tracking circuit 1306, and determines whether or not interpolation of tracking position is necessary based on the result of comparison. The tracking position correction suitability judging section 1307*c* outputs a tracking position that has been determined.

The interpolation and tracking circuit 1306 has an image memory 1306*a* and an interpolation subject position calculation section 1306*b*. The image memory 1307*a* sequentially stores image data of each frame after a time at which interpolation subject position was interpolated (first frame of image for detection generation in FIG. 7), for image data read out from the image sensor 114 in fixed frames.

The interpolation subject position calculation section 1306*b* performs interpolation processing for subject position, on respective image data stored in the image memory 1306*a*, using subject detection positions where features patterns have been searched for and then output by the feature detection circuit 1305. Specifically, the interpolation subject position calculation section 1306b outputs a position that has had a movement amount added to a subject detection position that was detected by the feature detection circuit 1305, as an interpolation subject position.

Details of processing in the interpolation subject position calculation section 1306b will be described later using FIG. 7 and FIG. 9, but here an overview will be described. If feature detection processing has been performed using an image of the first frame, the interpolation subject position calculation section 1306b performs interpolation processing for subject position in the image of the second frame. Interpolation processing is performed by adding movement amount of the subject in the second frame to subject position in the first frame.

After that, the interpolation subject position calculation section 1306b performs interpolation processing for subject position by sequentially reading out frame images stored in the image memory 1306a, namely the third frame, . . . . If there is a match between order of the frame image that has currently been read out from the image sensor 114 and order of the frame for which interpolation processing is performed, the interpolation subject position calculation section 1306b makes a subject position that was calculated by interpolation processing an interpolation subject position, and outputs this position to the tracking position correction suitability judgment section 1307c within the tracking circuit 1307.

In this way, the tracking circuit 1307 detects position of a specified subject by pattern matching or the like, using current frame image and previous frame image, for every input of a frame image. Also, if specified subject position is output from the feature detection circuit 1305 at specified frame intervals, the interpolation and tracking circuit 1306 reads out previous frame images in order, and performs interpolation processing using specified subject position that was obtained by subjecting position of the specified subject within the previous frame images to feature detection processing. Then, if the interpolation subject position calculation section 1306b has calculated a final specified subject position, the subject position at that time is output to the tracking position correction suitability judging section 1307c as an interpolation subject position.

It should be noted that the image memory 1307a and image memory 1306a may store all image data for every frame, and may store data of frame images at fixed intervals. However, a fixed interval for storing frame images is made shorter than a frame interval for performing feature detection processing in the feature detection circuit 1305. Also, some or all of the computational processing in the tracking position calculation section 1307b, tracking position correction suitability judging section 1307c, and interpolation subject position calculation section 1306b may be performed using hardware circuits, and may be performed by software processing using the CPU 1301.

Next, processing such as the tracking of this embodiment will be described using the flowcharts shown in FIG. 4A and FIG. 24B. It should be noted that this flow is realized by the CPU 1301 controlling each section etc. within the camera 100 in accordance with program code stored in the flash ROM 134.

If the main flow shown in FIG. 4A is commenced, it is first determined what has been set as the shooting mode (S1). With the camera 100 of this embodiment, it is possible to set the shooting mode using the camera operation switch 132 or the touch panel 124, and the user can set either still picture mode or movie mode.

If the result of determination in step S1 is that still picture mode has been set, next, live view display is commenced (S3). Here, the CPU 1301 performs live view display on the display device 120 based on image data that has been acquired by the image sensor 114. It should be noted that live view display involves acquisition of image data from the image sensor 114, and updating of the image, every time a time corresponding to a fixed frame rate elapses.

If live view has been commenced, it is next determined whether or not the 1st release SW is on (S5). If the user performs preparatory operations for shooting, they press the release button down halfway. Here, the CPU 1301 determines whether or not the 1st release SW has been turned on in response to a half press operation of the release button. If the result of this determination is that the 1st release SW is off, a standby state is entered until the 1st release SW is turned on.

If the result of determination in step S5 is that the 1st release SW is on, next, release AF is performed (S7). Here, the CPU 1301 executes an autofocus (AF) operation. Specifically, the AF control circuit 1302 performs focus detection using image data etc. from the image sensor 114, and moves a focus lens within the photographing lens 102 in accordance with the results of this focus detection by means of the focus adjustment mechanism 104, so as to achieve a focused state.

If the AF operation has been performed in step S7, next, a tracking frame is displayed (S9). Here, the CPU 1301 displays a tracking frame on a subject that is a tracking target, within an image that is being displayed on the display device 120. The subject that is a tracking target may be designated by the user by manual operation, and may be determined by automatically determining a face or a body, a vehicle, or a subject that is at close range.

If the tracking frame has been displayed in step S9, next, feature detection processing is performed (S11). Here, the feature detection circuit 1305 detects features that have been set in advance from a frame image. Detailed operation of this feature detection processing will be described later using FIG. 5.

If feature detection processing has been performed in step S11, it is next determined whether or not feature detection has been completed (S13). Time is required for the detection of the specified subject using a neural network in the feature detection circuit 1305. Images for a fixed number of frames are output from the image sensor 114 until inference results are obtained after having input image data for one frame to the feature detection circuit 1305. During this time, with this embodiment, tracking processing is performed in step S17 etc.

If feature detection has been completed in step S13, interpolative tracking processing is performed (S15). Here, the interpolation and tracking circuit 1306 executes interpolative tracking processing. Detailed operation of this interpolative tracking processing will be described later using FIG. 6.

If interpolative tracking processing has been performed in step S15, or if the result of determination in step S13 is that feature detection is not completed, tracking processing is performed (S17). Here, every time image data of one frame is output, the tracking circuit 1307 executes processing in order to track the subject that has had a tracking frame displayed in step S9, using pattern matching processing or the like. It should be noted that while specified subjects refers to all subjects that have been detected from an image (in a case where there are a plurality of birds in an image, for example, the specified subjects means a plurality of birds), in step S9 a subject that has had a tracking frame displayed refers to a single subject among the specified subjects. Detailed operation of this tracking processing will be described later using FIG. 8.

If the tracking processing has been performed in step S17, next, AF processing is performed (S19). Here, the CPU 1301 executes AF processing so as to focus on a subject that is the tracking target for which position was obtained in the tracking processing of step S17.

If AF processing has been performed in step S19, it is next determined whether or not the 2nd release SW is on (S21). If composition and shooting timing are as the user intends, the user presses the release button down fully. In this step, the CPU 1301 determines whether or not the 2nd release SW has been turned on in response to a full press operation of the release button. If the result of this determination is that 2nd release SW is off, processing returns to step S11 and the operations described above are executed.

On the other hand, if the result of determination in step S21 is that the 2nd release SW is on, the tracking frame is non-displayed (S23). Here, the CPU 1301 sets the tracking frame that was displayed in step S9 to non-display.

If the tracking frame had been set to non-display in step S23, next, image data is stored (S25). Here, the CPU 1301 controls opening amount of the aperture 106 by means of the AE control circuit 1303 and the aperture drive mechanism 108, and controls opening and closing of the mechanical shutter 110 by means of the AE control circuit 1303 and the shutter drive mechanism 112. After the mechanical shutter 110 has been opened, once an exposure time elapses and the mechanical shutter 110 is closed the image sensor IF circuit 116 reads out pixel data from the image sensor 114, and outputs image data to the system controller 130. The image processing circuit 1304 applies image processing for storage to the image data, and memory control circuit 1310 stores the image data that has been subjected to image processing in the storage medium 128.

Once image data has been stored in step S25, next, tracking data is stored to TagData (S27). Here, the memory control circuit 1310 stores tracking data in a storage region for TagData (metadata) of the image data. Tracking data is stored in the SDRAM 118. This tracking data is data relating to position etc. of a subject that has been made a tracking target, within an image. This tracking data is stored in a storage region for TagData of the image data. If tracking data has been stored in TagData in step S27, this flow is terminated.

Returning to step S1, if the result of determination in this step is that the shooting mode is movie mode, then similarly to step S3 live view display is commenced (S31). It is next determined whether or not the movie button SW is on (S33). The user presses the movie button when commencing movie shooting. Here, the CPU 1301 determines whether or not the movie button has been pressed to turn the movie button SW on. If the result of this determination is that the movie button SW is off, a standby state is entered until the movie button SW is turned on.

If the result of determination in step S33 is that the movie button SW is on, then a tracking frame is displayed, similarly to step S9 (S35). Next, similarly to step S11, feature detection processing is executed (S37), and whether or not feature detection has been completed is determined, similarly to step S13 (S39). If the result of this determination is that feature detection has been completed, then interpolative tracking processing is performed, similarly to step S15 (S41). If interpolative tracking processing has been performed, or if the result of determination in step S39 is that feature detection is not completed, next, similarly to S17, tracking processing is performed (S43). Next, AF processing is performed, similarly to step S19 (S45).

Next, storage of movie data is performed (S47). Here, the CPU 1301 controls opening amount of the aperture 106 by means of the AE control circuit 1303 and the aperture drive mechanism 108, and places the mechanical shutter 110 in an open state by means of the shutter drive mechanism 112. Exposure control is control based on aperture value and ISO sensitivity value. The image sensor IF circuit 116 reads out image data from the image sensor 114 in accordance with a fixed frame rate, and outputs the image data to the system controller 130. The image processing circuit 1304 applies image processing for storage, and generates a movie file. The memory control circuit 1310 stores the movie file that has been generated in the storage medium 128.

Once image data has been stored, next, similarly to step S27, tracking data is stored to TagData (S49). It is next determined whether or not the movie button SW is off (S51). The user presses the movie button again if movie shooting is to be finished. Here, the CPU 1301 determines whether or not the movie button SW has been turned off in response to the movie button having been pressed again. If the result of this determination is that the movie button SW is on, processing returns to step S37, and the previously described operation is executed.

On the other hand, if the result of determination in step S51 is that the movie button SW is off, then the tracking frame judge is set to non-display (S53), similarly to step S23. If the tracking frame has been set to non-display, this flow is terminated.

In this way, in the main flow shown in FIG. 4A and FIG. 4B, tracking processing is performed every time image data for one frame is output from the image sensor 114 (S17, S43), feature detection processing is performed at a fixed frame interval, and if a specified subject has been extracted (S11 and Yes in S13, S37 and Yes in S39), interpolative tracking processing is performed (S15, S41). Specifically, together with performing tracking by means of pattern matching etc. for every frame, position of a tracking target is corrected using position of the specified subject that was extracted by the feature detection processing at a fixed frame interval. That is, position of a target subject that has been detected by tracking processing is corrected using results of high precision feature detection processing. This means that it is possible to perform tracking at high speed and with high precision.

It should be noted that although the tracking processing of steps S17 and S43 may not be performed for every frame, it is performed at a narrower frame interval than the frame interval at which the feature detection processing of steps S11 and S37 is performed.

Next, the feature detection processing in steps S11 and S37 will be described using the flowchart shown in FIG. 5. If the flow for feature detection processing is commenced, it is first determined whether or not feature detection has been completed (S61). Feature detection processing initially involves inputting image data for one frame that has been acquired from the image sensor 114 to the input layer 1305a of the feature detection circuit 1305 (refer to FIG. 2). If the feature detection circuit 1305 has completed processing, results are output from the output layer 1305c. The CPU 1301 performs determination based on whether or not the result has been output from the output layer 1305c of the feature detection circuit 1305. If the result of this determination is that feature detection is not complete, this flow is terminated and the originating flow is returned to.

On the other hand, if the result of determination in step S61 is that feature detection has been completed, next, subject detection processing is performed (S63). Here, the CPU 1301 extracts information for a specified subject that has been detected by the feature detection circuit 1305. As information on the specified subject, there is, for example, region occupied by the specified subject, position of the specified subject, and the type of specified subject.

If subject detection processing has been performed in step S63, next, detection result association processing is performed (S65). Here, based on information of a body region and a parts region, included in the specified subject, if they are a body region and a parts region of the same subject they belong to the same subject, and the CPU 1301 performs association of the two. This detection result association processing will be described in detail in the second embodiment (refer, for example, to FIG. 13). If detection result association processing has been performed, the feature detection processing is terminated and the originating flow is returned to.

Next, the interpolative tracking processing in steps S15 and S41 will be described using the flowchart shown in FIG. 6. If the flow for interpolative tracking processing is commenced, first, subject detection position is acquired (S71). Here, the interpolation and tracking circuit 1306 acquires subject detection position from the feature detection circuit 1305 (refer to FIG. 3).

Next, a frame image is acquired (S73). Here, the interpolation subject position calculation section 1306*b* within the interpolation and tracking circuit 1306 acquires image data for one frame from the image sensor 114 (refer to FIG. 3). Next, acquisition processing for an image is performed (S75). Here, the image memory 1306*a* performs acquisition processing of frame images, into image memory, from a frame image of the image data that was input to the feature detection circuit 1305, up to a frame that has been imaged at the current point in time. It should be noted that in this processing the image memory 1306*a* may sequentially store image data each time image data for one frame is output from the image sensor 114.

If the image acquisition processing has been performed in step S75, next, interpolation subject position is calculated (S77). Here, the interpolation subject position calculation section 1306*b* performs correction for a frame image at the point in time at which that frame image was input to the feature detection circuit 1305, using subject detection position from the feature detection circuit 1305. Then, after the above described time point at which data was input, previous image data is sequentially read out, and the subject position is corrected (interpolated) (refer to the interpolative tracking processing in FIG. 7 and FIG. 9). Then, if correction (interpolation) of subject position has been completed for a frame image that has been currently formed, interpolation subject position is output. It should be noted that in a case where the feature detection circuit 1305 has detected a plurality of subject positions, a target for interpolative tracking is determined in accordance with priority order. Once an interpolation subject position has been calculated, the flow for interpolative tracking processing is terminated and the originating flow is returned to.

Next, operation to detect target subject from input images by combining output of the feature detection circuit 1305 and feature detection output using a pattern matching method will be described using the timing chart shown in FIG. 7. With this embodiment, an image region to be focused on by driving a focus lens is made a target subject, and the feature detection circuit 1305 detects a specified subject. Generally, with a method that performs feature detection using a neural network, processing time becomes long because there are many computational processing steps, and as a result it is not possible to detect a specified subject in every image frame. Therefore, frame images that have been acquired while the feature detection circuit 1305 is detecting a specified subject are temporarily saved in the image memory 1306*a*, and when the interpolation subject position calculation section 1306*b* has detected a specified subject feature, patterns that have been detected by the feature detection circuit 1305 are retrieved and an interpolation subject position is output.

In FIG. 7, the horizontal axis represents time. Items shown on the vertical axis represent, sequentially from the top, imaging frame timing (VD signal)
time when imaging exposure is in progress
timing for registering image for detection in image memory
timing for performing interpolative tracking processing
timing for the feature detection circuit 1305 to detect a specified subject
timing for executing autofocus (AF).

Also, with the example shown in FIG. 7 imaging is at 60 fps (images for 60 frames are formed in one second).

In FIG. 7, a first exposure is performed from time T1 to time T2, and since exposure is completed at time T2 generation of a first image for detection is commenced. Since generation of the first image for detection is completed by the time T3, the feature detection circuit 1305 commences detection processing for a specified subject. Next, detection processing for the specified subject is finished by time T63. The feature detection circuit 1305 therefore outputs a feature detection result notification to the interpolation and tracking circuit 1306. Also, the interpolation subject position calculation section 1306*b* within the interpolation and tracking circuit 1306 reads out a second frame image that is temporarily saved in the image memory 1306*a*, and performs interpolative tracking processing for the second frame image using feature amounts of the specified subject. If interpolative tracking processing for the second frame image is completed, next, a third frame image is read out and interpolative tracking processing is similarly performed.

Interpolative tracking processing is repeated until time T83. Specifically, from time T63 until time T83 subject movement amount up to the current frame is calculated in interpolative tracking processing. If interpolative tracking processing for the 80th frame image is completed by time T83, next, an 81st frame image is handled. However, since an actual image for detection (81st image) is generated at this time, the interpolative tracking result is fed back to an 82nd image for AF detection.

In this way, with this embodiment, since processing speed of the feature detection circuit 1305 is slow, during this processing, there is supplementation by means of a tracking method using other feature amounts. For example, in the example shown in FIG. 7, in a case where frame rate for live view shooting is 60 fps and detection rate for feature detection is 1 fps, exposure progresses up to a 62nd frame, at the point in time where the feature detection has completed processing for the first frame. Accordingly, it is not possible to perform focusing on a target subject in real time, based on detection results from the feature detection circuit 1305.

Therefore, with this embodiment, images for detection while the feature detection circuit 1305 is performing computational processing (input images for pattern matching etc.) are saved in internal memory (image memory 1306*a*), and after processing completion by the feature detection circuit 1305 a subject that has been detected by the feature detection circuit 1305 is tracked using a tracking method that uses other feature amounts from the second frame (interpolative tracking). As the other feature amounts, for example, tracking results from brightness information etc. may be used.

While interpolative tracking is being performed, tracking results are output using a method that tracks in real time, and focusing is performed on a target subject. As methods for tracking in real time, besides the previously described tracking method that uses brightness information there are, for example, a tracking method using color information, a tracking method based on information for feature points, and face detection and body detection etc.

Next, the tracking processing in steps S17 and S43 (refer to FIG. 4A and FIG. 4B) will be described using the flowchart shown in FIG. 7. If the flow for tracking processing is commenced, it is first determined whether or not it is the first frame for tracking commencement (S81). Tracking determines a subject that will constitute a tracking target in the first frame, and after that this target subject is tracked. Here, the CPU 1301 determines whether or not it is the first frame on which tracking has been performed.

If the result of determination in step S81 is that it is the first frame for tracking commencement, next, tracking information is stored (S83). Here, the CPU 1301 stores tracking information, for example, a face, body, brightness, or color, which are a tracking target, or feature point information etc. in memory (for example, the SDRAM 118).

If tracking information has been stored in step S83, or if the result of determination in step S81 is that it is not the first frame for tracking commencement, acquisition of a frame image is performed (S85). Here, the tracking circuit 1307 acquires image data for one frame from the image sensor 114.

Next, image acquisition processing is performed (S87). Here, the tracking circuit 1307 temporarily saves frame images from a frame image at a point in time where image data is input to the feature detection circuit 1305 (for example, with the example of FIG. 7, time T3) up to a frame that has been imaged at the current point in time (for example, with the example of FIG. 7, time T81) in the image memory 1307*a*. It should be noted that with this image acquisition processing images are temporarily saved in the image memory 1307*a* every time image data for one frame is output from the image sensor 114. Also, the image acquisition processing may be such that some frame images, among all of the frame images that have been formed, are temporarily saved in the image memory 1307*a*.

If image acquisition processing has been performed, next, tracking position is calculated (S89). Here, the tracking position calculation section 1307*b* within the tracking circuit 1307 calculates position of a tracking target subject (tracking position) using a pattern matching method or the like, for a frame image that was previously acquired (temporarily saved in image memory 1307*a*) and a frame image that has been acquired at this time.

If tracking position has been calculated, tracking position correction necessity determination is next performed (S91). Here, the tracking position correction suitability judging section 1307*c* within the tracking circuit 1307 determines whether or not correction of tracking position is necessary.

With this determination, tracking position that has been calculated by the tracking position calculation section 1307*b* of the tracking circuit 1307 is compared with a tracking position that has been interpolated by the interpolation and tracking circuit 1306 based on subject detection position from the feature detection circuit 1305, and if the two subject positions are a fixed distance or more apart it is determined that correction of tracking position is necessary. If it has been determined that correction of tracking position is necessary, then tracking position is corrected using results of having subjected a subject to interpolative tracking, in the interpolation subject position calculation section 1306*b*.

If tracking position correction necessity determination has been performed, next, display of a tracking frame is updated (S93). Since tracking position is obtained in steps S89 and S91, here the CPU 1301 updates the position of the tracking frame displayed on the display device 120. If display of the tracking frame has been updated, the originating flow is returned to.

Next, operation at the time of tracking a target subject from an input image, in the tracking AF operation, will be described using the timing chart shown in FIG. 9.

In FIG. 9, the horizontal axis represents time. Items shown on the vertical axis represent, sequentially from the top, imaging frame timing (VD signal)
time when imaging exposure is in progress
timing for registering image for detection in image memory
timing for performing tracking processing (tracking processing for target subject)
timing for performing interpolative tracking processing
timing for the feature detection circuit 1305 to detect specified subject Also, with the example shown in FIG. 9 imaging is at 60 fps (images for 60 frames are formed in one second).

In the tracking processing of FIG. 9, for frame image data that has been stored in the image memory 1307*a* detection of a specified subject is performed for every frame image data, in order to perform tracking (refer to S89 in FIG. 8). Also, in the feature detection processing, at the time when a detection result for a specified subject has been output (time when an image for detection of the 61st frame has been stored in image memory 1307*a*, time T62), the feature detection circuit 1305 outputs a detection result for a specified subject. In the interpolative tracking processing, feature patterns, that have been detected by the feature detection circuit 1305, within each frame image that has been stored in the image memory 1306*a*, are retrieved using a pattern matching method or the like, and movement amounts for a target subject from a frame that was detected by the feature detection circuit 1305 to the current frame are obtained. Then, in the tracking processing, it is determined whether to correct, or to not correct, tracking position to a position of the subject that was calculated by adding movement amount of the previously described target subject to position of the specified subject that has been detected by the feature detection circuit 1305 (refer to the 81st tracking processing, S91 in FIG. 8).

In FIG. 9 also, a first exposure is performed from time T1 to time T2, and since exposure is completed at time T2 generation of a first image for detection is commenced. Since generation of a first image for detection is completed by time T3, the tracking circuit 1307 commences tracking processing, and if a second image for detection is generated by time T4 the tracking circuit 1307 calculates a tracking position (refer to S89 in FIG. 8). After that, the tracking circuit 1307 calculates a tracking position every time an image for detection is generated.

On the other hand, since generation of the first image for detection is completed by the time T3, the feature detection circuit 1305 commences detection processing for a specified subject. Detection processing for a specified subject by the feature detection circuit 1305 is as was described using FIG. 7, and so detailed description is omitted. If interpolative tracking processing for the 80th frame image is completed by time T83, next, an 81st frame image results. However, since an actual image for detection (81st image) is generated at this time, the interpolative tracking result is fed back to an 81st image for detection. Here, feedback of interpolative tracking result is correction of detection result.

In this way, with this embodiment, when the subject is being tracked, a detection result of the feature detection circuit 1305 is fed back to the tracking circuit 1307 that is performing tracking processing in real time.

Figure 10:
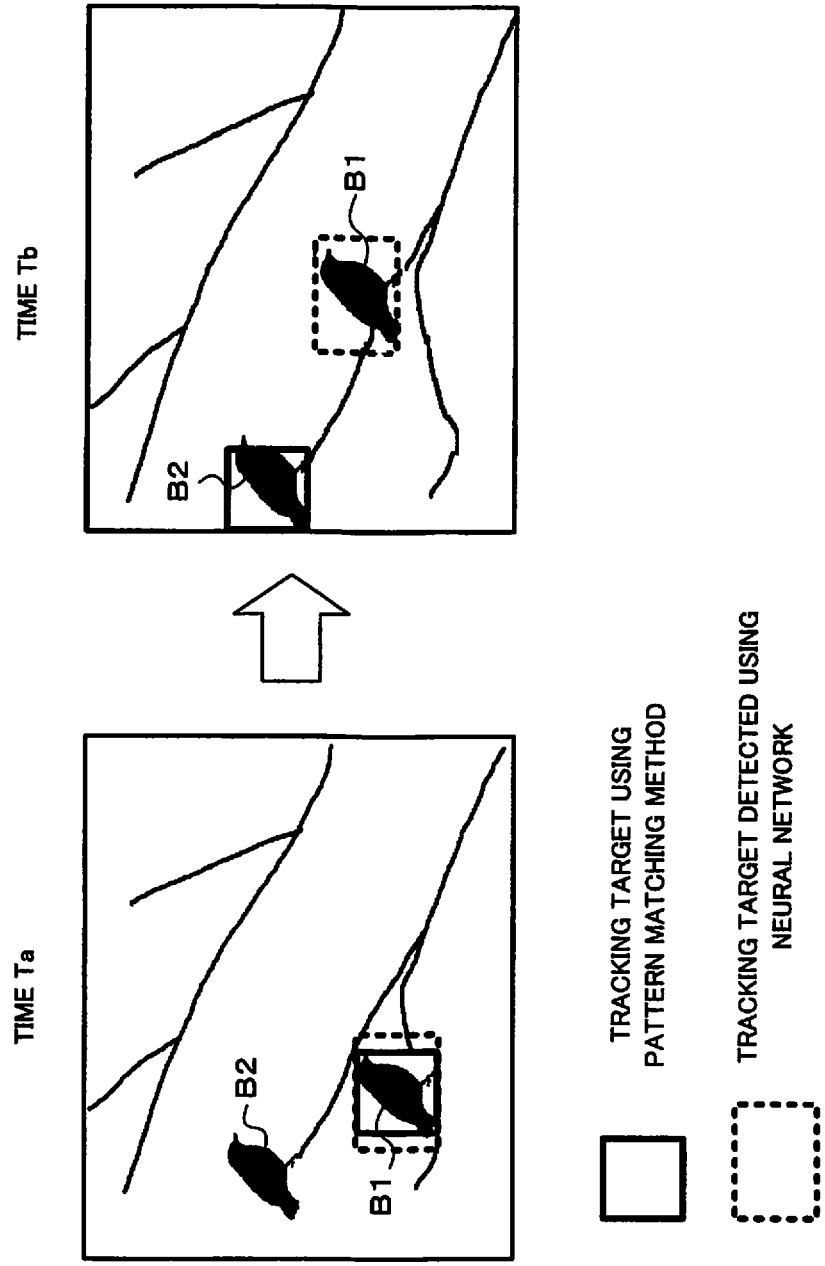
FIG. 10 is a drawing for describing tracking that uses matching processing, and tracking that uses a neural network, in the camera of the first embodiment of the present invention.

Next, correction of detection results in the tracking processing will be described using FIG. 10. In the event that a plurality of similar subjects exist within an image for detection, there may be cases where the feature detection circuit 1305 detects different subjects across frames. In FIG. 10, a rectangular solid line frame shows a tracking target in a case of performing tracking using a pattern matching method, and a rectangular dashed line frame shows a tracking target detected using a neural network within the feature detection circuit 1305.

In FIG. 10, at time Ta a tracking target from a pattern matching method, and a tracking target detected by the feature detection circuit 1305 are both a wild bird B1, and are the same. However at time Tb the tracking target from a pattern matching method is the wild bird B2, while the tracking target detected by the feature detection circuit 1305 is wild bird B1, and the two are not in accord.

A distance on the screen between the subject that has been tracked using a pattern matching method and the subject that has been detected by the feature detection circuit 1305 is therefore obtained, and if the two subjects are separated by a distance that is greater than a fixed amount the detection result of the feature detection circuit 1305 is fed back to tracking processing using the pattern matching method, that is, the detection position is corrected (refer to S91 in FIG. 8). As a result of this processing it is possible to properly track a target subject.

Next, a tracking method that is used in the tracking processing will be described. With a tracking method that uses brightness information, a brightness distribution pattern of a fixed range for frame N−1, and a brightness distribution pattern of a fixed range for frame N, are relatively moved. Movement amount when both brightness patterns match is made a movement amount for tracking. There is also a tracking method that uses color information. With this method, information for a fixed range in frame N−1 is extracted, and a region of the same color information is extracted from within frame N. A distance to the region of the same color information is made a movement amount for tracking. There is also a tracking method that uses faces and bodies. With this method faces and bodies are extracted from within a screen of frame N−1, and the same faces and bodies are extracted from within a screen of frame N. A distance to a region of the same faces and bodies between the frames N−1 and N is made a movement amount for tracking.

The feature detection circuit 1305 having the neural network can detect various subjects based on learning data. Patterns of specified subjects take various forms. As one example, in a case where shape of the subject changes significantly between frames, such as when tracking an athlete etc., detection using pattern matching is difficult, and so the previously described tracking method that uses color information of an image is preferably selected. In this case, there is a switch from pattern matching to tracking using color information, and both tracking using the tracking circuit 1307 and subject detection using the feature detection circuit 1305 are used. On the other hand, in a case where subject shape does not change significantly between frames, such as when tracking a vehicle that is traveling, a tracking method that uses pattern matching is preferably selected.

In the interpolation and tracking circuit 1306, frames to be interpolated are as follows. All frames that have been saved in internal memory (image memory 1306a) are subjected to tracking processing. However, making all frames targets is not limiting, and it is also possible to make frames that have been thinned out targets. Alternatively, in a case where movement amount of a subject across frames is detected, and magnitude of movement of the subject that has been detected is larger than a determination threshold value, it is preferable to subject all frames to tracking processing. On the other hand, if magnitude of movement amount of the subject that has been detected is smaller than a determination threshold value, frames that have been thinned from all of the frames may be subjected to tracking processing. By thinning out frames, it is possible to shorten the time required for feeding back (correcting) a result that has been detected by the feature detection circuit 1305 (target subject).

In the interpolation and tracking circuit 1306, degree of priority for interpolative tracking is as follows. The feature detection circuit 1305 can detect a plurality of portions simultaneously, from a single image. For example, there may be cases where, when a specified subject is a "wild bird", it is possible to simultaneously detect the "whole body", "head", and "eyes" of a wild bird. However, in a case where interpolative tracking by the feature detection circuit 1305 cannot perform interpolative tracking processing for a plurality of sites at the same time, sites where interpolative tracking processing will be performed are determined based on a degree of priority that has been set in advance. For example, in a case where the specified subject is a "wild bird", degree of priority for sites where interpolative tracking processing will be performed is set in the order of "eyes", "head", and "whole body" of the wild bird. In this case when it is possible to detect the "eyes" of the wild bird interpolative tracking processing is performed based on position of the "eyes". In a case where it is not possible to detect the "eyes" of the wild bird, when it is possible to detect the "head" of the bird interpolative tracking processing is performed based on position of the "head".

In a case where the execution period for feature detection in the feature detection circuit 1305 can attain a speed of a fixed frame rate (for example, 30 fps), the feature detection circuit 1305 may change a control method when different subjects have been detected, such as when movement of subject position is large between frames. For example, a detection result of the feature detection circuit 1305 is fed back to the tracking processing (correction of detection result) only when a distance between the same subject that has been detected by the feature detection circuit 1305 for the current frame and the previous frame is within a threshold value range.

Image display for tracking target position is as shown below. In a case where there is a difference between tracking position using pattern matching etc. and subject position that has been detected by the feature detection circuit 1305, at the time that a detection result of the feature detection circuit 1305 has been fed back (detection target has been corrected), a tracking frame that has been depicted on the display device 120 of the camera (for example, a rear surface liquid crystal display section) may move suddenly and significantly. As a result, this will appear bad to the photographer (user). Therefore, in a case of steep, significant movement, display of tracking position (tracking frame) may be depicted so that there is gradual movement across a number of frames.

As has been described above, with the first embodiment of the present invention, the camera 100 comprises an imaging section that exposes a subject image and repeatedly outputs image signals, resulting from having subjected the subject image to photoelectric conversion, at a fixed period (for example, the image sensor 114 and image sensor IF circuit 116), a subject detection section that has the image signals input to a neural network circuit that has learned operation parameters for detecting a specified subject or deep learning, and detects the specified subject (for example, the feature detection circuit 1305), and a subject detection and interpolation section that interpolates tracking position based on feature amounts of the subject, for images acquired from the image signals, with position of the subjects that has been detected by the subject detection section made a reference (for example, the interpolation and tracking circuit 1306). This means that at the time of performing shooting with a target subject that moves, it is possible to cause a focus lens to be in-focus by tracking position of the target subject in real time, even if time is required for the subject detection section to detect the target subject for a frame image, Next, a second embodiment of the present invention will be described using FIG. 11 to FIG. 16. Compared to the first embodiment, the second embodiment performs tracking of a subject by extracting a whole subject and parts of the subject, and associating the whole subject and the parts of the subject.

The structure of the second embodiment is the same as the structure of the first embodiment shown in FIG. 1A and FIG. 1B. A point of difference is that the internal structure of the feature detection circuit 1305 is different. This point will be described using FIG. 11.

Figure 3:
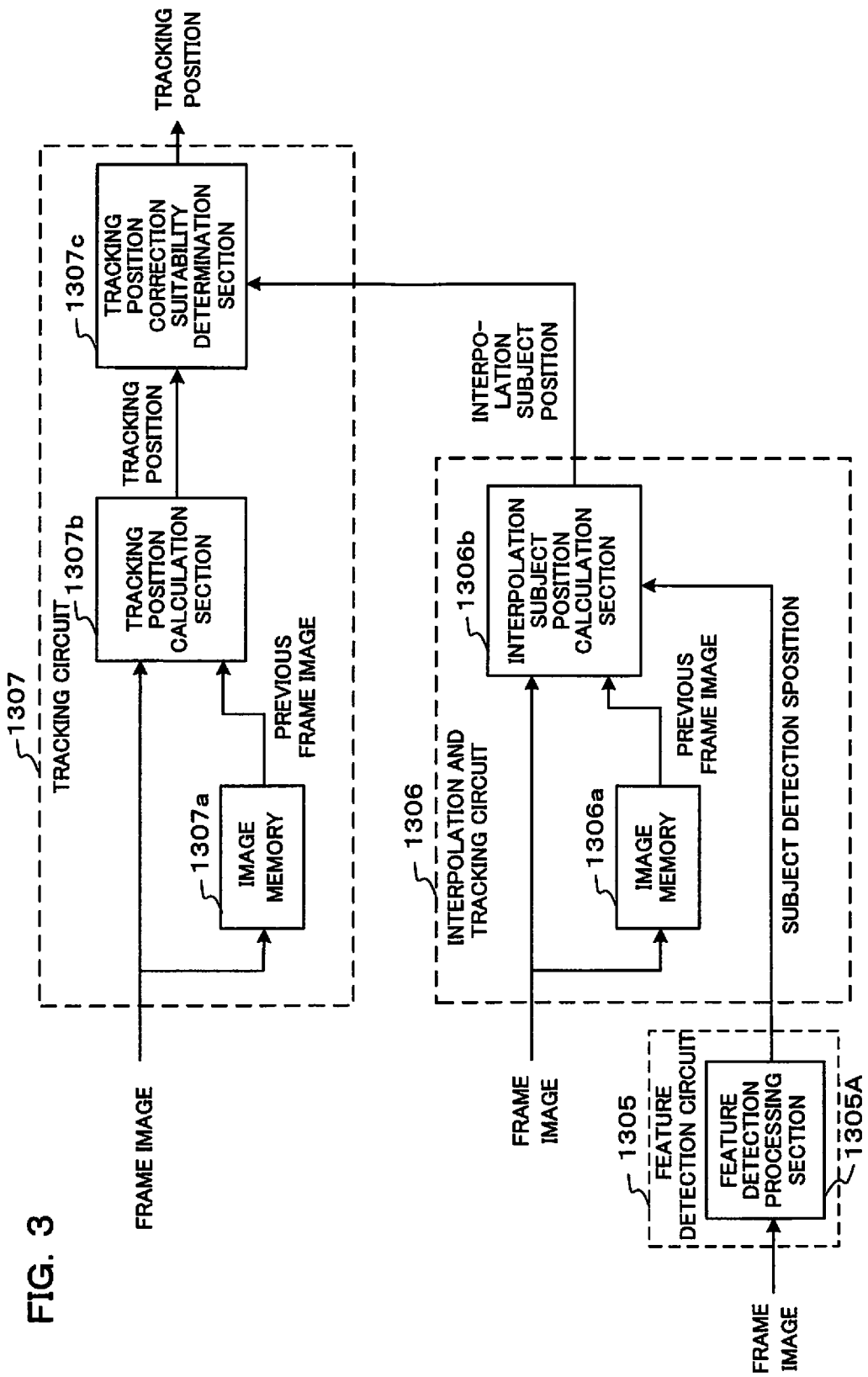
FIG. 3 is a block diagram of a circuit for outputting tracking position from frame images, in the camera of the first embodiment of the present invention.
Figure 11:
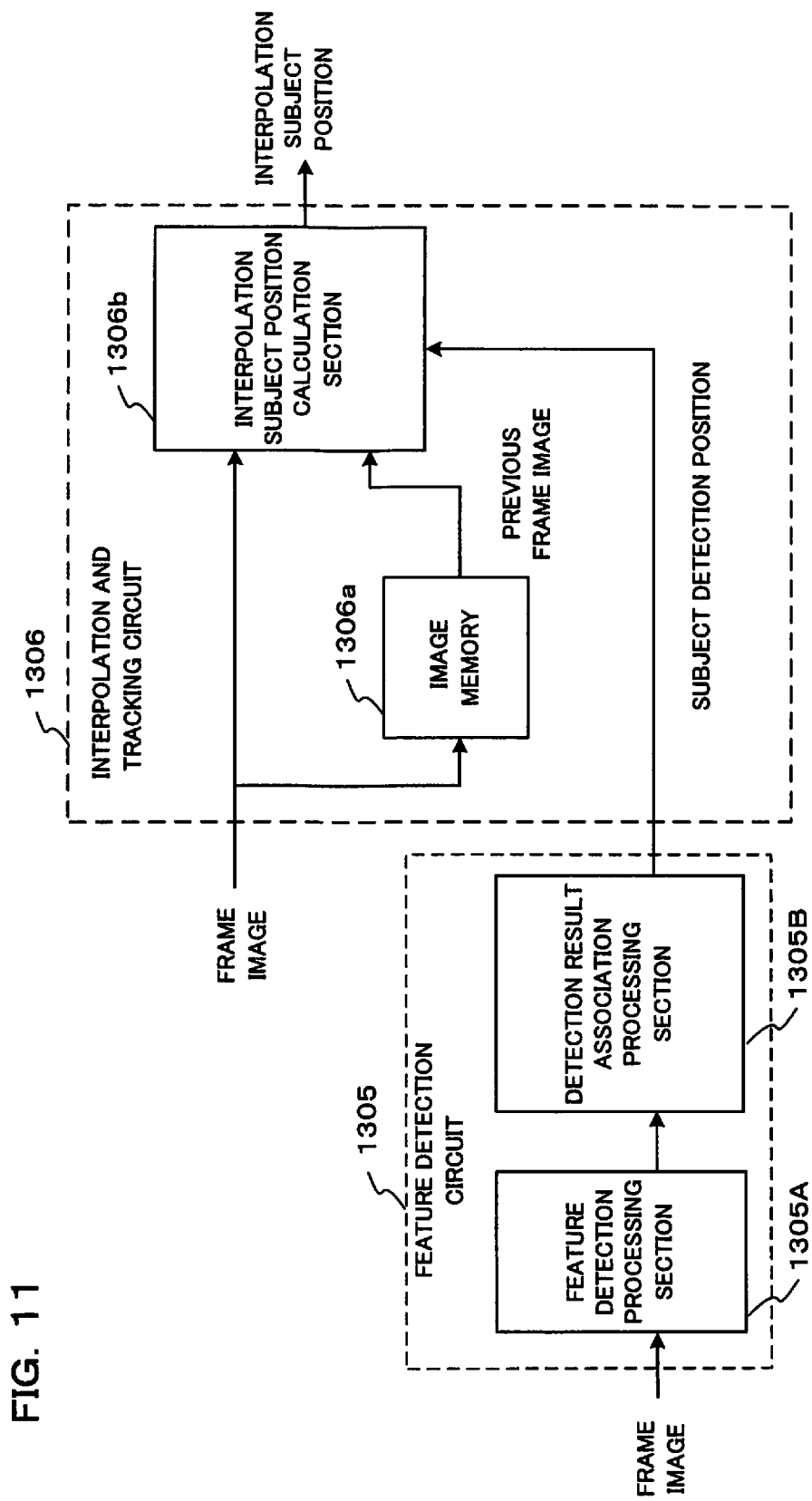
FIG. 11 is a block diagram showing a circuit for performing tracking processing in the camera of a second embodiment of the present invention.

In FIG. 11, the internal structure of the interpolation and tracking circuit 1306 is the same as the circuit structure shown in FIG. 3. The feature detection circuit 1305 has the detection result association processing section 1305B in addition to the feature detection processing section 1305A. The feature detection processing section 1305A can detect an image that contains an entire subject (body) and an image that contains a region of part of the subject (parts) one time, when detecting a specified subject. The detection result association processing section 1305B performs processing to associate the body and parts that have been detected in the input images. It should be noted that this processing is called detection result association processing.

Figure 12:
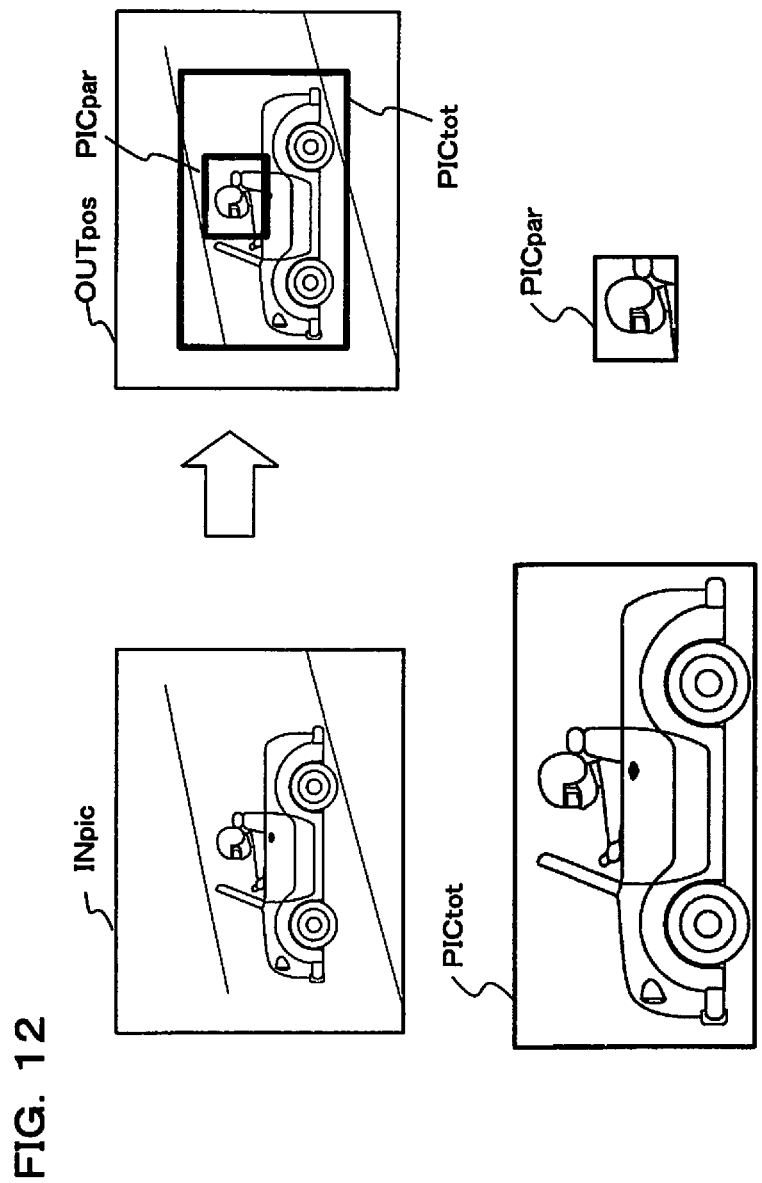
FIG. 12 is a drawing for explaining association of parts and an entire subject, in the camera of the second embodiment of the present invention.

The detection result association processing will be described using FIG. 12. If an input image INpic is input to the feature detection processing section 1305A within the feature detection circuit 1305, it is possible to acquire subject position OUTpos of the input image. The input image INpic is an image of an entire vehicle PICtot, and further, a helmet of the driver exists inside the entire vehicle PICtot as a parts image PICpar. The feature detection processing section 1305A sets the entire image and parts image as respective feature images, and it is possible to detect subject detection position information OUTpos in the respective feature images.

Figure 5:
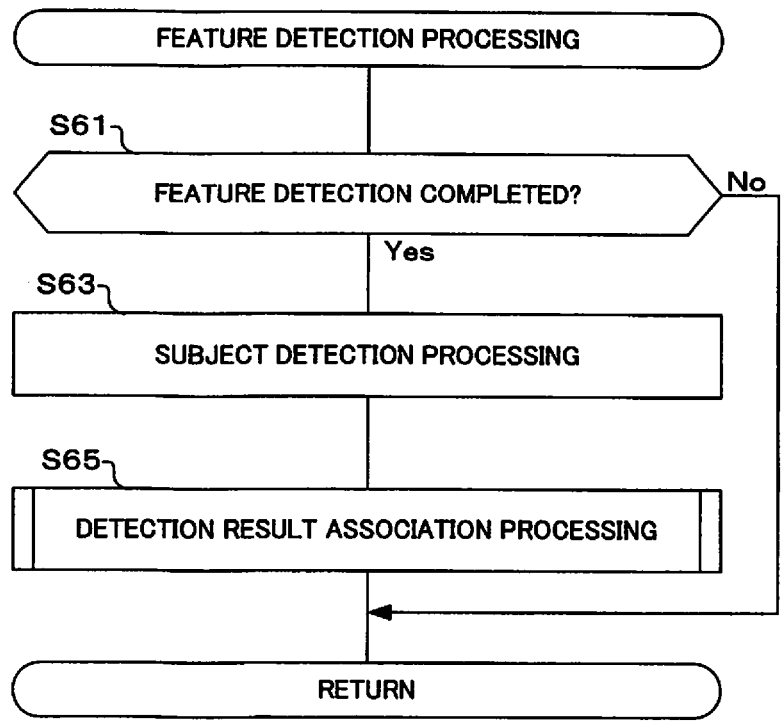
FIG. 5 is a flowchart showing operation of feature detection processing, in the camera of the first embodiment of the present invention.

The detection result association processing section 1305B within the feature detection circuit 1305 functions as a subject association determination circuit (subject association determination section) that performs association based on a positional relationship between a subject (entire subject) and parts that have been detected by the subject detection circuit (subject detection section) (refer, for example, to S11 be in FIG. 4A, S37 in FIG. 4A, and S65 in FIG. 5). The specified subject is a subject (whole subject) and parts that have been subjected to subject association. The subject association determination circuit (subject association determination section) performs association based on distance between a subject (whole subject) and parts that have been detected by the subject detection circuit (subject distance detection section).

The detection result association processing section 1305B within the feature detection circuit 1305 further comprises a positional relationship conditions circuit (positional relationship conditions section) that determines a positional relationship for the subject association determination circuit (subject association determination section). The positional relationship conditions circuit (positional relationship conditions section) performs judgment with a center position of a parts detection region that have been detected by the subject detection circuit (subject detection section) being within the detection range of the subject that has been detected by the subject detection circuit (subject detection section), or a distance between a subject and a central position of the parts detection region being in a specified range, as conditions (refer, for example to FIG. 13). The positional relationship conditions circuit (positional relationship conditions section) widens, or narrows, a range of a subject detection region in accordance with classification of the subject that has been detected by the subject detection circuit (subject detection section).

In the event that a plurality of parts that have been detected by the subject detection circuit (subject detection section) are to be associated, the above described subject association determination circuit (subject association determination section) associates a subject and the closest part to the subject. The detection result association processing section 1305B further comprises a time series data reliability determination circuit (time series data reliability determination section) that determines reliability of positions of a subject and parts that have been detected by the subject detection circuit (subject detection section). The subject association determination circuit (subject association determination section) determines that subject and parts positions that have been determined to be valid based on determination result from the time series data reliability determination circuit (time series data reliability determination section) are suitable as target subject and parts positions. The above-described time series data reliability determination circuit (time series data reliability determination section) determines reliability based on position of the subject and position of parts across images of a plurality of frames.

Tracking operation of the camera of the second embodiment is the same as the main flow shown in FIG. 4A and FIG. 4B, and the flow showing detailed operation, with the addition of the detailed processing in the detection result association processing of step S65 (refer to FIG. 5). Detail of the detection result association processing will therefore be described using the flowchart shown in FIG. 13.

Figure 13:
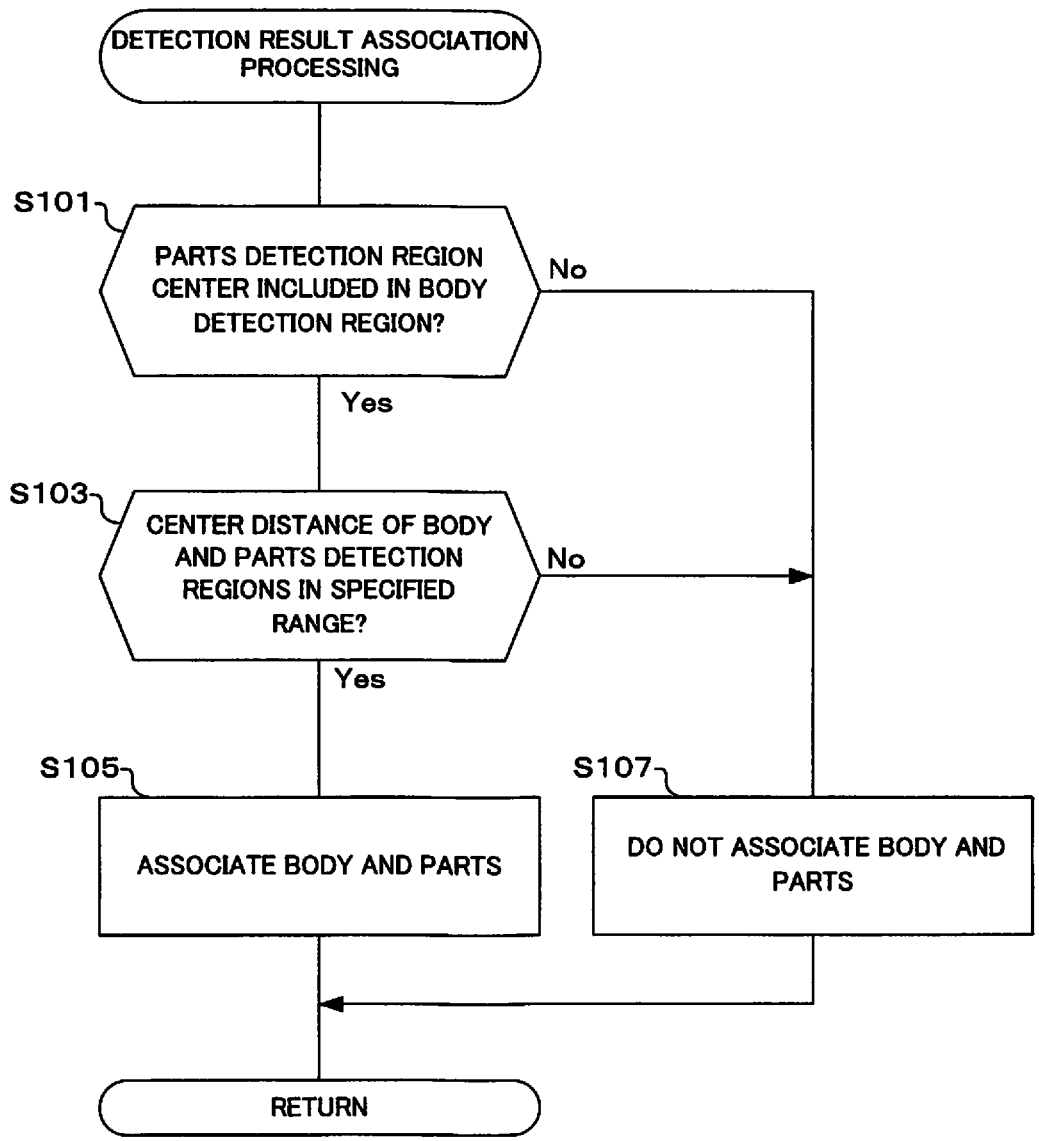
FIG. 13 is a flowchart showing operation of detection result association processing, in the camera of the second embodiment of the present invention.
Figure 14:
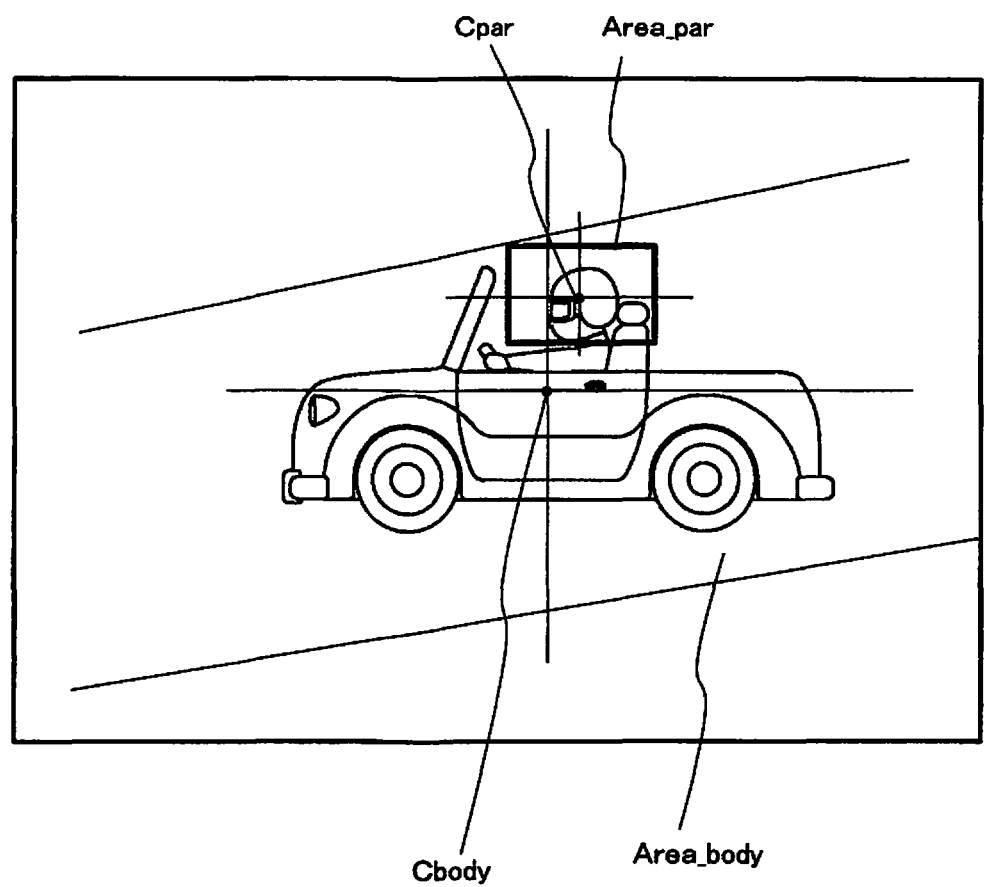
FIG. 14 is a drawing for describing detection regions for body and parts, in the camera relating to the second embodiment of the present invention.

If the detection result association processing shown in FIG. 13 is commenced, it is first determined whether a center of a parts detection region is included in a body detection region (S101). Here, the detection result association processing section 1305B determines the relationship between a body detection region and a center position of a parts detection region, that have been detected by the feature detection processing section 1305A. For example, it is determined whether or not a center Cpar of a parts detection area Area_par is included within a body detection area Area_body, as shown in FIG. 14.

If the result of determination in step S101 is that center position of the parts detection region is included in the body detection region, it is next determined whether or not a center distance of body and parts detection regions is within a specified range (S103). Here, the detection result association processing section 1305B determines a relationship between center position of a body detection region and center position of a parts detection region, that have been detected by the feature detection processing section 1305A. For example, it is determined whether or not a distance between center Cbody of the body detection area Area_body and center Cpar of the parts detection area Area_par is within a specified range, as shown in FIG. 14.

If the result of determination in step S103 is that the center distance of the body and parts detection regions is within a specified range, association of body and parts is performed (S105). Here, the detection result association processing section 1305B associates the body and parts that have been detected as a relationship indicating that they are for the same subject.

On the other hand if the result of determination in step S101 is that the center position of the parts detection region is not included within the body detection region, or if the result of determination in step S103 is that center distance between the body and parts detection regions is not within a specified range, association of body parts is not performed (S107). Here, the detection result association processing section 1305B does not associate the body and parts that have been detected.

If an association between body and parts has been defined in steps S105 or S107, the originating flow, namely step S65 in FIG. 5, is terminated and the flow returns to FIG. 4A or FIG. 4B.

Next, a method of determining whether or not body and parts are for the same subject, that is performed in the flowchart shown in FIG. 13, will be described.

As a first method of determining whether or not body and parts are for the same subject, a method of determining from positions of the body and parts will be described. The flowchart of FIG. 13 determines whether or not body and parts are for the same subject, using this first determination method. If a specified positional relationship for body and parts that has been output from the neural network within the feature detection processing section 1305A satisfies both or any one of the two conditions below, the relationship is considered to be for the same subject.

(Condition 1): That center position of a parts detection region is included within a body detection region.
(Condition 2): That distance between center positions of body and parts detection regions is within a specified range. It should be noted that range of detection regions may be expanded, or reduced, depending on the subject classification, for any of condition 1 or condition 2.

There may be cases where the feature detection processing section 1305A detects a plurality of parts for a single body. In this case, if the above conditions are satisfied, priority may be given to associating parts having the closest positional relationship. Also, in a case where positional relationship between the body and parts is defined in advance, and positional relationship that has been associated departs from the definition, it may be determined to not associate the body and parts.

As a second method of determining whether or not body and parts are for the same subject, a method of determining from time series positions of the body and parts will be described. Among a plurality of items of information for specified body parts that have been output from the neural network within the feature detection processing section 1305A are maintained, only information that can be detected continuously across specified frames is subjected to a determination, and if the following two conditions are satisfied, or if one condition is satisfied, the outcome is a detection result that the body and parts are for the same subject. These two determinations are different in that while the above described first determination method is determination for images of one frame using two conditions, the second determination method is determination based on information that can be detected in continuous frames.

(Condition 1): That center position of a parts detection region is included within a body detection region.
(Condition 2): That distance between center positions of body and parts detection regions is in a specified range. It should be noted that range of detection regions may be expanded, or reduced, depending on the subject classification, for condition 1 or condition 2.

Figure 15:
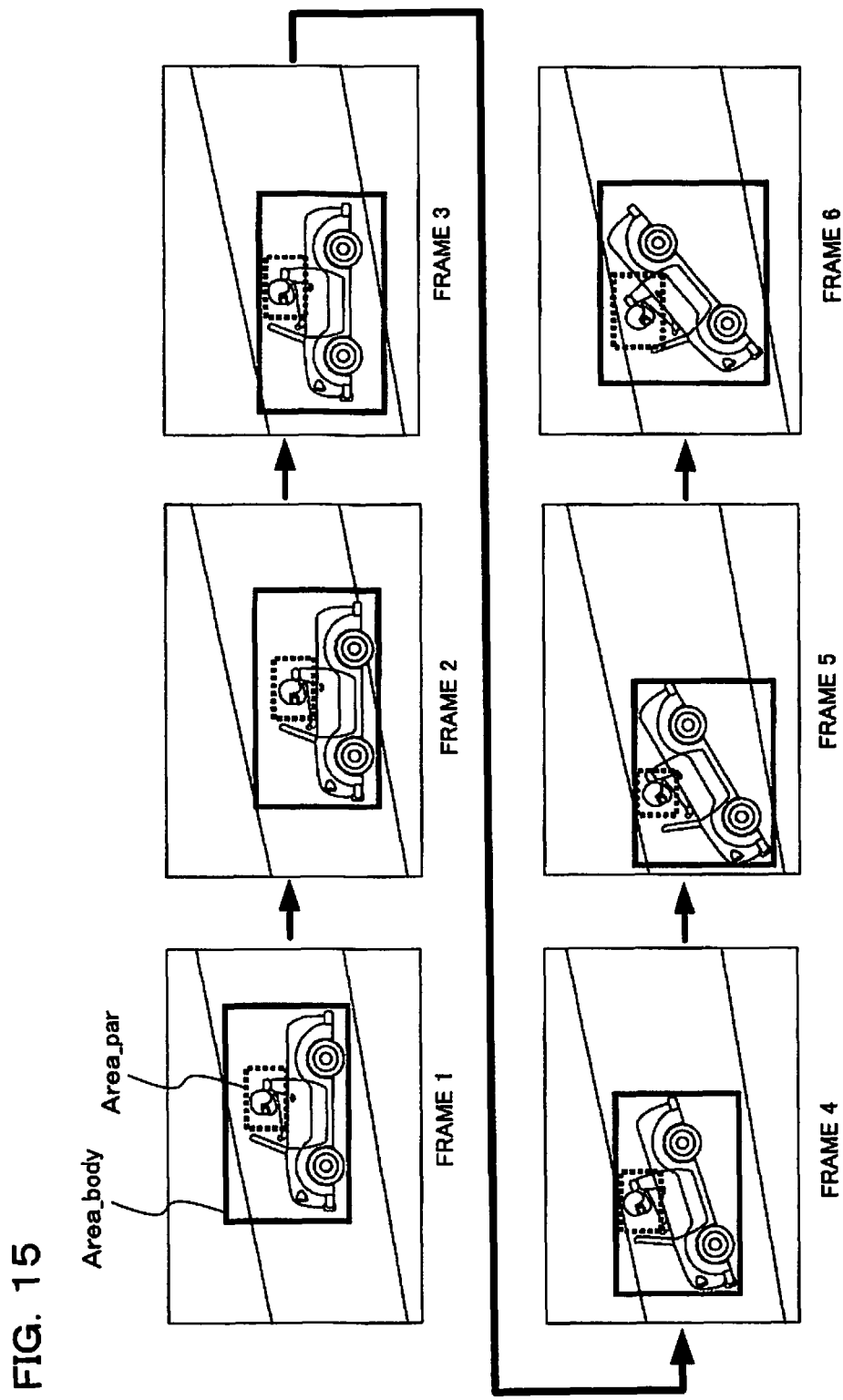
FIG. 15 is a drawing for describing detection regions for body and parts, in the camera relating to the second embodiment of the present invention.

FIG. 15 shows an example of determining whether or not a body and parts are of the same subject, from time series positions of a body and parts. With the example shown in FIG. 15, there are six frame images for frames 1 to 6 as time series images. A vehicle is a body in each frame image, and the helmet of the driver is parts. A body region is Area_body, and a parts region is Areapar. Since the above conditions 1 and 2 are satisfied in all of the frames, body area Area_body and parts area Areapar are associated in each frame.

As determination as to whether or not it is possible to detect the same subject across continuous frames, if, in the information that has been output from the neural network, positional relationship, amount of change in size, and reliability, are within a specified range across frames, it is determined that it is possible to detect the same subject. The above described reliability is determined based on reliability of output results of the neural network, and association results for previous frames. Also, regarding the above described specified range, threshold values of the specified range may be changed based on optical flow. It should be noted that optical flow is overall movement amount and direction across frames for frame images from a current frame image to the next frame image (also called global vectors).

In a case where detection results cannot be obtained from the neural network, it is determined whether or not the same subject can be detected across a number of continuous frames, using a position that has been interpolated using tracking processing that is performed based on brightness information and color information. Also, in a case where a plurality of parts satisfy conditions for a single body, priority may be given to associating the parts having the closest positional relationship. Alternatively, it may be determined not to perform association. Also, in a case where positional relationship between the body and parts is defined in advance, and a positional relationship that has been associated departs from the definition, it may be determined to not associate the body parts.

As a third method of determining whether or not body and parts are for the same subject, a method of determining based on subject distance of the body and parts from the camera will be described. With this third determination method, for specified body and parts that have been output from the neural network, if a subject distance to the body and a subject distance to the parts are within a specified range the outcome is a detection result that they are for the same subject.

As a method of computing subject distance, for example, a phase difference sensor is provided in the image sensor 114, and if it is possible for the AF control circuit 1302 to perform focus detection using a phase difference method it is possible to calculate the subject distance from the camera to the body, and subject distance to the parts. Also, in a case where focus adjustment is performed using a so-called contrast method, using image data from the image sensor 114, it is possible to calculate the subject distance from the camera to the body, and subject distance to the parts, based on a focus lens position at the time when the body and parts are in focus.

Next, another example of the detection result association processing of step S65 (refer to FIG. 5) will be described using the flowchart shown in FIG. 16. With this example association processing is performed using the above-described third determination.

Figure 16:
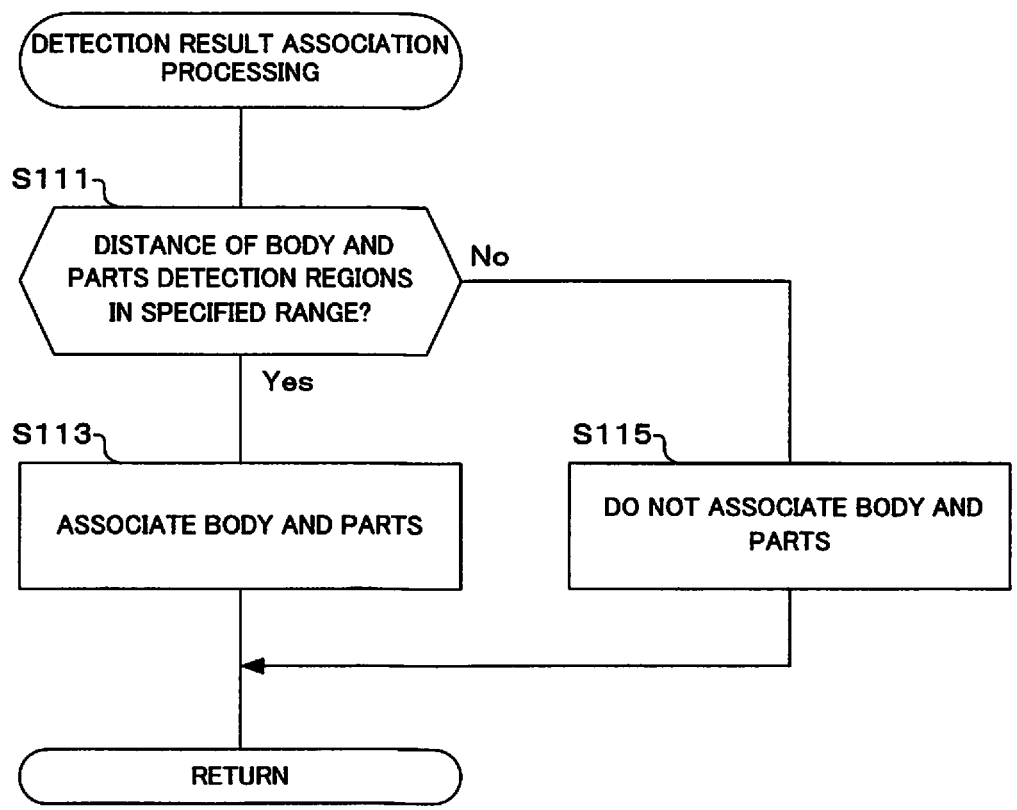
FIG. 16 is a flowchart showing another example of operation of detection association result processing, in the camera of the second embodiment of the present invention.

If the flow for detection result association processing in FIG. 16 is commenced, it is first determined whether or not distance between the body and parts detection regions is within a specified range (S111). Here, the detection result association processing section 1305B acquires subject distance information that has been detected using the AF detection circuit 1302 for the body and parts that have been detected by the feature detection processing section 1305A, respectively. The detection result association processing section 1305B then determines whether or not the subject distance information that has been acquired for the body and parts are within a specified range.

If the result of determination in step S111 is that the subject distance is within a specified range, the body and parts are associated (S113). On the other hand, if the subject distance is not within a specified range the body and parts are not associated (S115). If the processing of steps S113 or S115 has been performed, the originating processing flow is returned to.

It should be noted that in this flow, in a case where a plurality of parts satisfy conditions for a single body, priority may be given to associating the parts at the closest distance. Alternatively, it may be determined not to perform any association.

With this embodiment, a display method for the display section (display device 120) in the case where it has been determined that the body and parts are for the same subject is performed as described below. In the case where body and parts for the same subject have been associated, a detection frame may be displayed having a different color, or different shape, or different thickness to other detections frames. Also, detection results that are associated with the same subject may be subjected to a highlighted display. Also, a detection frame may be displayed for only body or parts of detection results that are associated with the same subject. A subject and parts that have been associated in the subject association determination circuit (subject association determination section) are displayed on the display (display section) distinguished from other subjects.

As has been described above, with the second embodiment of the present invention, the camera 100 is provided with a subject association determination section (for example, the detection result association processing section 1305B) that performs association based on a positional relationship between a subject (whole body) and parts that have been detected by the subject detection section (for example, the feature detection processing section 1305A), and a specified subject has a subject (whole body) and parts that have been subjected to subject association. As a result, it is possible to detect and track parts that constitute a target, even if a plurality of parts, that include parts that are different from a target subject, exist in a range of the target subject to be tracked. Also, when shooting a subject in which a target subject is moving, it is possible to detect position of the target subjects without error, by performing association processing of the entire subject (body) and feature portions (parts) even if a plurality of entire subjects (bodies) and feature portions (parts) exist within a frame image and are respectively detected by the feature detection circuit.

Figure 17:
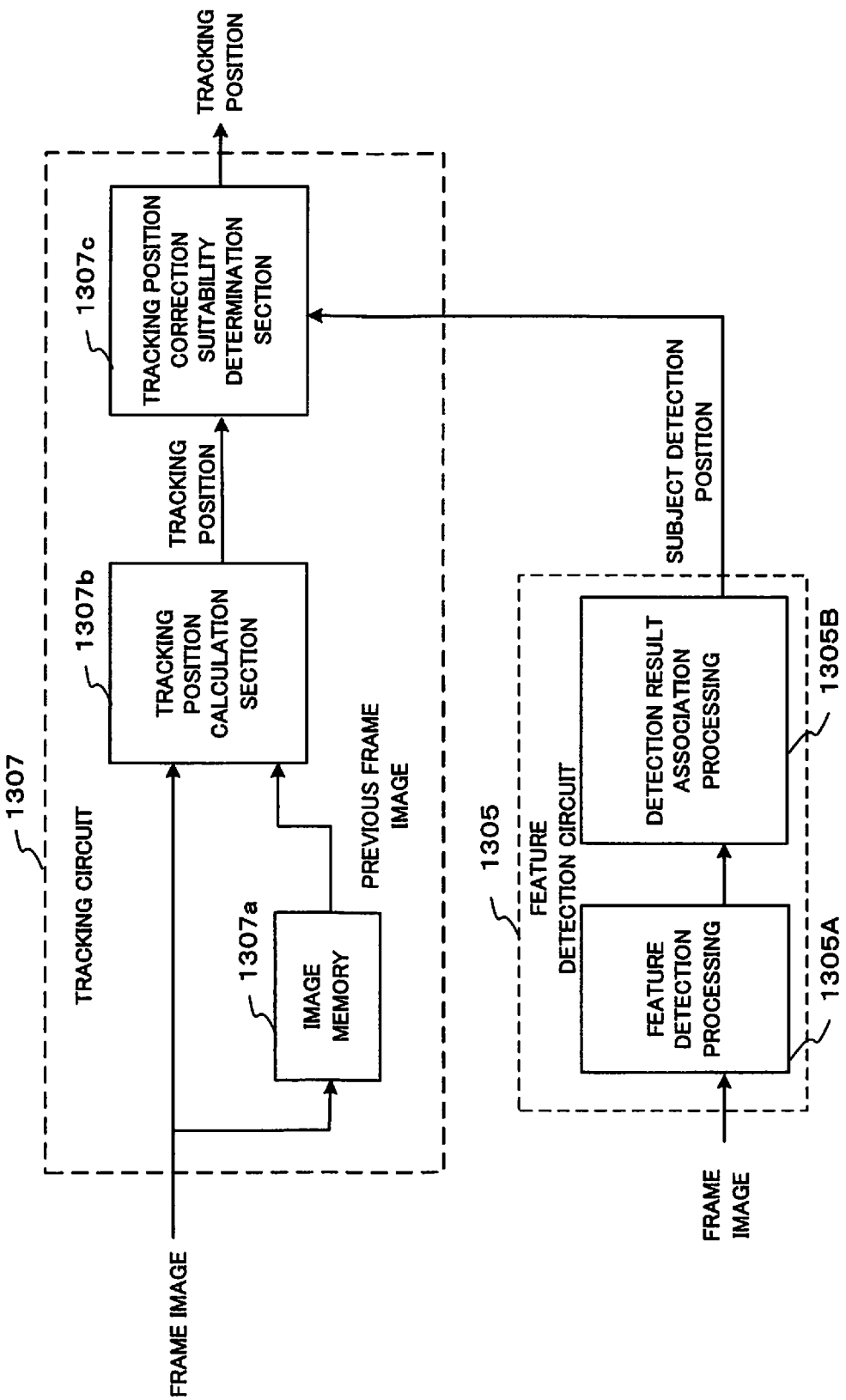
FIG. 17 is a block diagram showing another example of a circuit for performing tracking processing in the camera of the first and second embodiments of the present invention.

Next, a modified example of the first and second embodiments of the present invention will be described using FIG. 17. With the second embodiment, the detection result association processing section 1305B was provided within the feature detection circuit 1305, in addition to the feature detection processing section 1305A provided in the first embodiment, and association processing for body parts was performed. With this modified example, the interpolative tracking processing circuit is omitted in a case where it is possible for the feature detection processing section 1305A to perform processing up to detection of a target subject from a frame image in a short time.

The structure of this modified example of the first embodiment has the interpolation and tracking circuit 1306 of FIG. 1B omitted, and has the interpolation and tracking circuit 1306 of FIG. 3 omitted. Also, in the second embodiment the interpolation and tracking circuit 1306 may be omitted, as shown in FIG. 17, instead of FIG. 11. In this case subject position information output from the detection result association processing section 1305B within the feature detection circuit 1305 is output directly to the tracking position correction suitability judging section 1307c of the tracking circuit 1307.

As has been described above, the imaging device and tracking method of each of the embodiments and modified examples of the present invention expose a subject image, and repeatedly output image signals resulting from subjecting the subject image to photoelectric conversion at a fixed period (refer, for example, to the image sensor 114 in FIG. 1A, and S3 in FIG. 4A), detect a specified subject from the image signals using a neural network circuit that has learned operation parameters for detecting the specified subject (refer, for example, to the feature detection circuit 1305 in FIG. 1A, and S11 in FIG. 4A), and perform association based on a positional relationship between a body portion and parts portion in the specified subject that has been detected (refer to the feature detection circuit 1305 in FIG. 1A, the detection result association processing section 1305B in FIG. 11, S11 in FIG. 4A, S65 in FIG. 5, and S105 in FIG. 13). The specified subject is a subject (whole subject) and parts that have been subjected to subject association. As a result, it is possible to detect and track parts that constitute a target, even if a plurality of parts, that include parts that are different from a target subject, exist in a range of the target subject to be tracked.

Also, the imaging device and tracking method of each of the embodiments and modified examples of the present invention expose a subject image, and repeatedly output image signals resulting from subjecting the subject image to photoelectric conversion at a fixed period (refer, for example, to the image sensor 114 in FIG. 1A, and S3 in FIG. 4A), input the image signals to a neural network circuit that has learned operation parameters for detecting the specified subject, and detect the specified subject (refer, for example, to the feature detection circuit 1305 in FIG. 1A, and S11 in FIG. 4A), and perform interpolation of a tracking position based on feature amounts of a subject, for images acquired from the image signals, with position of the specified subject that has been detected as a reference (refer, for example, to the interpolation and tracking circuit 1306 in FIG. 1B, S15 in FIG. 4A, and S77 in FIG. 6). As a result it is possible to reliably track a target subject, even in a case where a neural network is used that requires processing time in order to perform subject detection.

According to each of the embodiments and modified examples of the present invention, it is possible to provide an imaging device, and tracking method, that are capable of detecting and tracking parts constituting a target, even if a plurality of parts that include parts that are different to a target subject exist in a range of the target subject that will be tracked. It is also possible to provide an imaging device and tracking method that can reliably track a target subject, even in a case where a neural network is used that requires processing time in order to perform subject detection.

It should be noted that although, in each of the embodiments and modified examples of the present invention, the system controller 130 has various circuits such as the CPU 1301, AF control circuit 1302, AE control circuit 1303, image processing circuit 1304, feature detection circuit 1305, interpolation and tracking circuit 1306, and tracking circuit 1307 provided inside a processor, these various circuits may also be arranged externally to the processor constituting the system controller 130. Also, instead of hardware circuits, these various circuits and each of the sections within the circuits, may also be constructed in the form of software using a CPU and programs, or may be constructed in hardware such as gate circuitry generated based on a programming language described using Verilog, or may be constructed using a DSP (digital signal processor). These various circuits may also be respective circuit sections of a processor that is constructed using an integrated circuit, such as an FPGA (Field Programmable Gate Array). Suitable combinations of these approaches may also be used. The use of a CPU is also not limiting as long as elements fulfill a function as a controller.

Also, with each of the embodiments and modified examples of the present invention, an instrument for taking pictures has been described using a digital camera, but as a camera it is also possible to use a digital single lens reflex camera or a compact digital camera, or a camera for movie use such as a video camera or movie camera, and further to have a camera that is incorporated into a mobile phone, a smartphone a mobile information terminal, personal computer (PC), tablet type computer, game console etc., or a camera for medical use (for example, a medical endoscope), a camera for a scientific instrument such as a microscope, an industrial endoscope, a camera for mounting on a vehicle, a surveillance camera etc. In any event, it is possible to apply the present invention as long as a device is for taking pictures.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   an image sensor that exposes a subject image and repeatedly outputs image signals resulting from having subjected this subject image to photoelectric conversion at a fixed period;
   a subject detection circuit, in which the image signals are input to a neural network circuit that has learned operation parameters for detecting a specified subject by deep learning, that detects the specified subject;
   a subject association determination circuit for forming associations based on a positional relationship between a subject that has been detected by the subject detection circuit, and parts of the subject,
   wherein the specified subject is a subject and parts; and
   a positional relationship conditions circuit that determines a position relationship for the subject association determination circuit, wherein
   the positional relationship conditions circuit performs judgment with a central position of a parts detection region that has been detected by the subject detection circuit being within a detection range of the subject that has been detected by the subject detection circuit, or a distance between centers of the subject and the parts detection region being in a specified range, as conditions, and
   the positional relationship conditions circuit widens, or narrows, a range of a subject detection region in accordance with classification of the subject that has been detected by the subject detection circuit.

2. The imaging device of claim 1, wherein:
   the subject association determination circuit associates a subject and parts that have the closest parts position, in a case where a plurality of parts that have been detected by the subject detection circuit are to be associated.

3. The imaging device of claim 1, further comprising:
a time series data reliability determination circuit that determines reliability of positions of a subject and parts that have been detected by the subject detection circuit, wherein
the subject association determination circuit makes positions of subject and parts, that have been determined to be valid based on determination result from the time series data reliability determination circuit, target positions for subject and parts.

4. The imaging device of claim 3, wherein:
the time series data reliability determination circuit determines reliability based on position of the subject and position of parts across images of a plurality of frames.

5. The imaging device of claim 1, further comprising:
a display that displays images based on the image signals, wherein
a subject and parts that have been associated in the subject association determination circuit are displayed on the display, discriminated from other subjects.

6. An imaging device comprising:
an image sensor that exposes a subject image and repeatedly outputs image signals resulting from having subjected this subject image to photoelectric conversion at a fixed period;
a subject detection circuit, in which the image signals are input to a neural network circuit that has learned operation parameters for detecting a specified subject by deep learning, that detects the specified subject;
a subject detection and interpolation circuit that interpolates tracking position, based on feature amounts of the subject, for images that are acquired from the image signals;
a subject tracking circuit that tracks a subject that has been designated in advance, in images acquired from the image signals; and
a subject tracking position correction circuit that corrects tracking position using results of having subjected a subject to interpolative tracking using the subject detection and interpolation circuit.

7. The imaging device of claim 6, further comprising:
a display that displays symbols depicting a tracking frame at a tracking position that has been corrected by the subject tracking position correction circuit.

8. The imaging device of claim 7, wherein:
the display determines and displays display positions of the symbols showing tracking positions, based on subject detection results that have been detected by the subject detection circuit from a current image, or subject detection results that have been detected from a previous image.

9. The imaging device of claim 6, wherein:
the subject detection and interpolation circuit, when performing tracking interpolation, subjects a subject to tracking interpolation by selecting a circuit for tracking that uses at least one from among brightness information, color information, feature point information, face detection information, and body detection information.

10. The imaging device of claim 6, wherein:
the subject detection and interpolation circuit selects a circuit for tracking interpolation based on subject detection results that have been detected by the subject detection circuit.

11. The imaging device of claim 6, further comprising:
a priority order setting circuit that sets a priority order for subjects that are subjected to interpolative tracking, for a plurality of subjects, wherein
in a case here the subject detection circuit has a detected a plurality of subjects, the subject detection and interpolation circuit performs interpolative tracking on a subject in accordance with priority order for the subjects that has been set in the priority order setting circuit.

12. The imaging device of claim 11, wherein:
in a case where the whole of an organism and the eyes have been detected as subjects by the subject detection circuit at the same time, the priority order setting circuit sets the whole of the organism, or the eyes or the organism, as subjects to be targets of interpolative tracking.

13. The imaging device of claim 11, wherein:
in a case where the whole of a vehicle and the driver of a vehicle have been detected simultaneously as subjects by the subject detection circuit, the priority order setting circuit sets the whole of the vehicle, or the driver, as subjects to be targets of interpolative tracking.

14. The imaging device of claim 6, wherein:
the subject tracking position correction circuit determines whether or not correction of tracking position is necessary based on tracking results of the subject tracking circuit, and interpolative tracking results of the subject detection and interpolation circuit.

15. The imaging device of claim 6, wherein:
the subject tracking position correction circuit determines whether or not correction of tracking position is necessary based on tracking results of the subject tracking circuit, and interpolative tracking positions of the subject detection and interpolation circuit.

16. The imaging device of claim 6, wherein:
the subject tracking position correction circuit determines whether or not correction of tracking position is necessary based on subject detection results that have been detected by the subject detection circuit from a current image, or subject detection results that have been detected from a previous image.

17. A tracking method, comprising:
exposing a subject image and repeatedly outputting image signals resulting from having subjected this subject image to photoelectric conversion at a fixed period;
detecting the specified subject using a neural network circuit that has learned operation parameters for detecting the subject, from the image signals;
forming associations based on a positional relationship between body portions and part portions, in the specified subject that has been detected, wherein
the specified subject is a subject and parts;
determining a position relationship;
performing judgment with a central position of a parts detection region being within a detection range of the subject, or a distance between centers of the subject and the parts detection region being in a specified range, as conditions; and
widening, or narrowing, a range of a subject detection region in accordance with classification of the subject.

18. A tracking method, comprising:
exposing a subject image and repeatedly outputting image signals resulting from having subjected this subject image to photoelectric conversion at a fixed period;
inputting the image signals to a neural network circuit that has learned operation parameters for detecting the specified subject, and detecting the specified subject;

interpolating tracking position, based on feature amounts of the subject, for images that are acquired from the image signals;

tracking a subject that has been designated in advance, in images acquired from the image signals; and correcting tracking position using results of having subjected a subject to interpolative tracking using the subject detection and interpolation circuit.

19. A non-transitory computer-readable medium storing a computer program for implementing a tracking method, the tracking method comprising:

exposing a subject image and repeatedly outputting image signals that have been subjected to photoelectric conversion at a fixed period, detecting the specified subject using a neural network circuit that has learned operation parameters for detecting the subject, from the image signals;

forming associations based on a positional relationship between body portions and part portions, in the specified subject that has been detected, wherein the specified subject is a subject and parts;

determining a position relationship;

performing judgment with a central position of a parts detection region being within a detection range of the subject, or a distance between centers of the subject and the parts detection region being in a specified range, as conditions; and widening, or narrowing, a range of a subject detection region in accordance with classification of the subject.

20. A non-transitory computer-readable medium storing a computer program for implementing a tracking method, the tracking method comprising:

exposing a subject image and repeatedly outputting image signals that have been subjected to photoelectric conversion at a fixed period, detecting the specified subject using a neural network circuit that has learned operation parameters for detecting the subject, from the image signals;

interpolating tracking position, based on feature amounts of the subject, for images that are acquired from the image signals;

tracking a subject that has been designated in advance, in images acquired from the image signals; and correcting tracking position using results of having subjected a subject to interpolative tracking using the subject detection and interpolation circuit.

* * * * *